US012757266B2

(12) United States Patent
Alpert et al.

(10) Patent No.: US 12,757,266 B2
(45) Date of Patent: Oct. 6, 2026

(54) MULTI-LINK CHANNEL ASSESSMENT

(71) Applicant: TEXAS INSTRUMENTS INCORPORATED, Dallas, TX (US)

(72) Inventors: Yaron Alpert, Hod Hasharon (IL); Yuval Matar, Hod Hasharon (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 443 days.

(21) Appl. No.: 17/898,917

(22) Filed: Aug. 30, 2022

(65) Prior Publication Data

US 2024/0073976 A1 Feb. 29, 2024

(51) Int. Cl.
*H04W 24/00* (2009.01)
*H04W 24/08* (2009.01)
*H04W 76/14* (2018.01)

(52) U.S. Cl.
CPC .......... *H04W 76/14* (2018.02); *H04W 24/08* (2013.01)

(58) Field of Classification Search
CPC .............................. H04W 24/08; H04W 76/14
See application file for complete search history.

(56) References Cited

U.S. PATENT DOCUMENTS

| | | | | |
|---|---|---|---|---|
| 9,847,925 B2* | 12/2017 | Mizrahi | H04L 43/0876 | |
| 2006/0221998 A1* | 10/2006 | Livet | H04L 12/5692 | 370/464 |
| 2007/0230373 A1* | 10/2007 | Li | H04B 7/0626 | 370/267 |
| 2012/0051246 A1* | 3/2012 | Zhang | H04L 1/0001 | 370/252 |
| 2024/0380640 A1* | 11/2024 | Silverman | H04L 25/0228 | |

FOREIGN PATENT DOCUMENTS

| | | | | |
|---|---|---|---|---|
| CA | 3177917 A1 * | 1/2022 | H04W 40/246 |
| CN | 104704870 B * | 7/2018 | H04B 7/0626 |
| EP | 2247042 A1 * | 11/2010 | H04L 43/04 |
| WO | WO-2014095927 A1 * | 6/2014 | H04L 43/10 |
| WO | WO-2022209212 A1 * | 10/2022 | H04W 74/0816 |
| WO | WO-2023191802 A1 * | 10/2023 | |
| WO | WO-2024005796 A1 * | 1/2024 | |

OTHER PUBLICATIONS

IEEE P802.11be/D2.1.1, Aug. 2022, New York, 889 pgs.

* cited by examiner

*Primary Examiner* — Phuc H Tran
(74) *Attorney, Agent, or Firm* — Michelle F. Murray; Charles F. Koch

(57) ABSTRACT

In at least one example, a method includes transmitting, by a first device, probe packets to a second device on multiple links over N transmission opportunities (TXOPs) with synchronous probing transmissions on the multiple links during each TXOP. N is an integer value greater than 1. Each probe packet corresponds to a different set of transmission parameters. Each link is established between the first device and the second device over different channels of a wireless transmission medium. The method further includes receiving, by the first device responsive to transmitting the probe packets, feedback from the second device on the multiple links in tandem with the synchronous probing transmissions over the N TXOPs. The method further includes selecting, by the first device, a preferred link from among the multiple links based on the feedback.

17 Claims, 10 Drawing Sheets

MULTI-LINK CHANNEL ASSESSMENT

BACKGROUND

Links established over channels of a wireless transmission medium can be useful to exchange data between wireless devices in various forms, such as messages or packets. Varying channel conditions can directly impact wireless system performance in terms of throughput, power consumption, packet loss, bit rate, transmission delay, availability, jitter, and/or other performance metrics. Accordingly, a wireless device may be configured to assess channel conditions with probing transmissions before transmitting data on a link to evaluate link quality, tune various transmission parameters of a link, or otherwise adapt link operation to account for channel conditions.

SUMMARY

In at least one example, a method includes transmitting, by a first device, probe packets to a second device on multiple links over N transmission opportunities (TXOPs) with synchronous probing transmissions on the multiple links during each TXOP. N is an integer value greater than 1. Each probe packet corresponds to a different set of transmission parameters. Each link is established between the first device and the second device over different channels of a wireless transmission medium. The method further includes receiving, by the first device responsive to transmitting the probe packets, feedback from the second device on the multiple links in tandem with the synchronous probing transmissions over the N TXOPs. The method further includes selecting, by the first device, a preferred link from among the multiple links based on the feedback.

In at least one example, a method transmitting, by a first device, probe packets to a second device as synchronous burst transmissions on multiple links during a transmission opportunity (TXOP). Each probe packet corresponds to a different set of transmission parameters. Each link is established between the first device and the second device over different channels of a wireless transmission medium. The method further includes receiving, by the first device responsive to transmitting the probe packets, feedback from the second device on the multiple links in tandem with the synchronous burst transmissions during the TXOP. The method further includes selecting, by the first device, a preferred link from among the multiple links during the TXOP based on the feedback.

In at least one example, a system includes a transceiver of a first multi-link device (MLD), a processor coupled to the transceiver, and memory coupled to the processor. The memory stores non-transitory instructions that are executable by the processor to cause the processor to perform operations. The operations include obtain, by the first MLD, a synchronous transmission opportunity (S-TXOP) at multiple links. The operations further include transmit, by the first MLD during the S-TXOP, probe packets to a second MLD with synchronous transmissions on the multiple links. Each link is established between the first MLD and the second MLD over different channels of a wireless transmission medium. The operations further include receive, by the first MLD responsive to transmitting the probe packets, feedback from the second MLD on the multiple links in tandem with the synchronous transmissions during the S-TXOP. The operations further include select, by the first MLD, a preferred link from among the multiple links based on the feedback.

DETAILED DESCRIPTION

Figure 1:
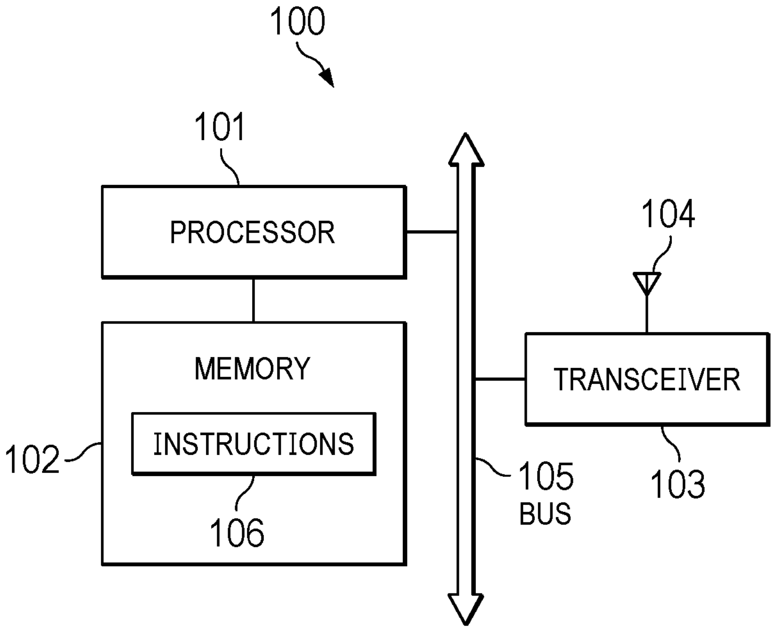
FIG. 1 is a block diagram of a communication system, in accordance with various examples.

As described above, a wireless device may be configured to assess channel conditions with probing transmissions before transmitting data on a link to evaluate link quality, tune various transmission parameters of the link, or otherwise adapt link operation to account for channel conditions. The wireless device may receive, responsive to channel assessment probing transmissions, feedback indicative of channel conditions. Channel conditions may dynamically vary over frequency and over time. Feedback indicative of channel conditions at one link may be irrelevant to channel conditions at an operation link or to another alternate potential operation link. Feedback indicative of channel conditions at a link at a given time may be irrelevant to channel conditions at the link at another time.

Some wireless devices may be configured to support multi-link (ML) operation or parallel transmission of data over different channels of a wireless transmission medium. For example, a multi-link device (MLD) is a wireless device that includes more than one station (STA). In at least one example, a STA can refer to a STA as described in the Institute of Electrical and Electronics Engineers (IEEE) 802.11 standard. Each STA of an MLD may be configured to establish a different link over a different channel of a wireless transmission medium by providing the MLD with a different physical layer (PHY) interface to the wireless transmission medium. Accordingly, an MLD with multiple STAs may be configured to establish multiple links with each link being established over a different channel of a wireless transmission medium. Each STA of an MLD may operate at a corresponding link to transmit data in the direction from the MLD (e.g., uplink) and to receive data in the direction to the MLD (e.g., downlink). During ML operation, data may propagate on different links of an MLD in the same direction (e.g., uplink or downlink) or in different directions (e.g., uplink and downlink). For example, an uplink transmission may propagate on a first link of an MLD from the MLD in parallel with an uplink transmission propagating on a second link of the MLD from the MLD or in parallel with a downlink transmission propagating on the second link to the MLD.

An MLD also includes a single link layer controller (LLC) coupled to each STA of the MLD to manage ML operations in a centralized manner. One aspect of managing ML operations may involve link selection. Some MLDs may be configured to assess channel conditions with unsynchronized probing transmissions at different links for link selection. Unsynchronized channel assessment may inherently be incapable of providing an LLC of an MLD with channel condition information for link selection that is both relevant to a particular link and timely (e.g., accurately reflects current channel conditions at the particular link). For example, an MILD establishes multiple links over different channels of a wireless transmission medium, and so each link may be diverse in a frequency domain. Another example, channel condition information for different links of an MILD may be refreshed at different rates with unsynchronized channel assessment based on channel availability and other factors. As described above, channel conditions may dynamically vary over frequency and over time. Assessing channel conditions at different frequencies with different refresh rates may be ineffective in providing accurate information regarding channel conditions that dynamically vary over frequency and over time. Link selection based on less than accurate channel condition information may be ineffective. Accordingly, unsynchronized approaches to channel assessment may be ineffective for link selection during ML operation.

Aspects of this description relate to a link selection process with simultaneous or substantially simultaneous assessment of channel conditions at multiple links. In at least one example, an MLD may select a preferred link from among multiple links with simultaneous or substantially simultaneous assessment of channel conditions at the multiple links. Simultaneous or substantially simultaneous assessment of channel conditions at the multiple links may involve the MLD transmitting probe packets to another MLD on the multiple links with synchronous probing transmissions. The MLD may receive, responsive to the synchronous probing transmissions, feedback in tandem with the synchronous probing transmissions on the multiple links. Receiving the feedback in tandem with the synchronous probing transmissions on the multiple links may synchronously refresh channel condition information for the multiple links at the MLD. Simultaneous or substantially simultaneous assessment of channel conditions at the multiple links may also involve the MLD transmitting probe packets to another MLD on the multiple links with synchronous burst transmissions. The MLD may receive, responsive to the synchronous burst transmissions, feedback in tandem with the synchronous burst transmissions on the multiple links. Receiving the feedback in tandem with the synchronous burst transmissions on the multiple links may synchronously refresh channel condition information for the multiple links at the MLD with reduced transmission latency between successive probing transmissions.

FIG. 1 is a block diagram of a communication system 100 that may be configured to process and exchange data, in accordance with various examples. Communication system 100 may be a wireless device, a desktop computer, a laptop, a tablet, a smartphone, or other device that may be configured to establish a link over a channel of a wireless transmission medium to transmit and to receive messages or packets, in accordance with a wireless communication standard. Communication system 100 may also be an MLD configured to support ML operation with multiple links established over multiple channels of a wireless transmission medium to transmit and to receive messages or packets, in accordance with a wireless communication standard. In some examples, communication system 100 may be a system on a chip (SoC), an electronic circuit board or a computer card.

Communication system 100 includes hardware components for establishing links over channels of a wireless transmission medium to transmit and receive data, in accordance with a wireless communication standard. As shown in FIG. 1, communication system 100 may include one or more processors 101 and one or more memories 102. Communication system 100 may also include one or more transceivers 103 and one or more antennas 104 for establishing links over channels of a wireless transmission medium. These components may be coupled through a bus 105, or in any other suitable manner. In FIG. 1, an example in which the components are coupled through a bus 105 is shown.

Processor 101 may be configured to read and execute computer-readable instructions. For example, processor 101 may be configured to invoke and execute instructions in a program stored in memory 102, including instructions 106. Responsive to processor 101 transmitting data, processor 101 drives or controls transceiver 103 to perform transmitting. Processor 101 also drives or controls transceiver 103 to perform receiving, responsive to processor 101 receiving data. Therefore, processor 101 may be considered as a control center for performing transmitting or receiving data and transceiver 103 is an executor for performing the transmitting and receiving operations. Processor 101 may include one or more processors. Processor 101 may include any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources. In some examples, processor 101 may include multiple components, such as any combination of the processing resources listed above, as well as other discrete or integrated logic circuitry, and/or analog circuitry.

In some examples, memory 102 is coupled to processor 101 through the bus 105. In other examples, memory 102 is integrated with processor 101. Memory 102 is configured to store various software programs and/or multiple groups of instructions, including instructions 106. In some examples, instructions 106 includes one or more link adaptation algorithms. This disclosure attributes functionality to communication system 100, processor 101, and instructions 106. Memory 102 may include one or more storage devices. For example, memory 102 may include a high-speed random-access memory and/or may include a nonvolatile memory such as one or more disk storage devices, a flash memory, another nonvolatile solid-state storage device, or a pseudo-static random-access memory (PSRAM). Memory 102 may store an OS such as ANDROID, IOS, WINDOWS or LINUX. Memory 102 may further store a network communications program. Communication system 100 uses the network communications program stored in memory 102 to perform communications with one or more attached devices, one or more user equipment, or one or more network devices. Memory 102 may further store a user interface program. The user interface program displays content of an application through a graphical interface and receive data or an operation performed by a user on the application via an input control such as a menu, a dialog box or a physical input device (not shown). Memory 102 may be configured to store instructions 106 for implementing the various methods and processes provided in accordance with the various examples of this description.

Transceiver 103 may include a transmitter and a receiver. Transceiver 103 may be configured to transmit one or more signals that processor 101 provides. Transceiver 103 may also be configured to receive one or more signals from other devices or equipment. In this example, transceiver 103 may be considered a wireless transceiver. Antenna 104 may be configured to enable the exchanging of wireless communication signals between transceiver 103 and a network or another system or device.

Communication system 100 may also include another communication component such as a WI-FI module, a Global Positioning System (GPS) module, cellular module, a BLUETOOTH or BLUETOOTH low energy (BLE) module, Zigbee module, Long Term Evolution (LTE), LTE-Machine Type Communication (LTE-M), Narrow Band LTE (NB-LTE), or a Sub-Gigahertz Communication (sub1G). Communication system 100 may also support another wireless communication signal such as a satellite signal or a short-wave signal. Communication system 100 may also be provided with a wired network interface or a local area network (LAN) interface to support wired communication.

In various examples, communication system 100 may further include an input/output interface (not shown) for enabling communications between communication system 100 and one or more input/output devices (not shown). Examples of the input/output devices include an audio input/output device, a key input device, a display and the like. The input/output devices are configured to implement interaction between communication system 100 and a user or an external environment. The input/output device may further include a camera, a touchscreen, a sensor, and the like. The input/output device may communicate with processor 101 through a user interface.

Communication system 100 shown in FIG. 1 is an example of a processing and communication system or device. During actual application, communication system 100 may include more or fewer components. Communication system 100 may be part of a wireless device that is connected to other wireless devices or STAs. Communication system 100 may also be part of an MLD that may be configured to exchange data with other wireless devices or STAs during ML operation in the form of messages or packets on multiple links established over different channels of a wireless communication medium.

Figure 2:
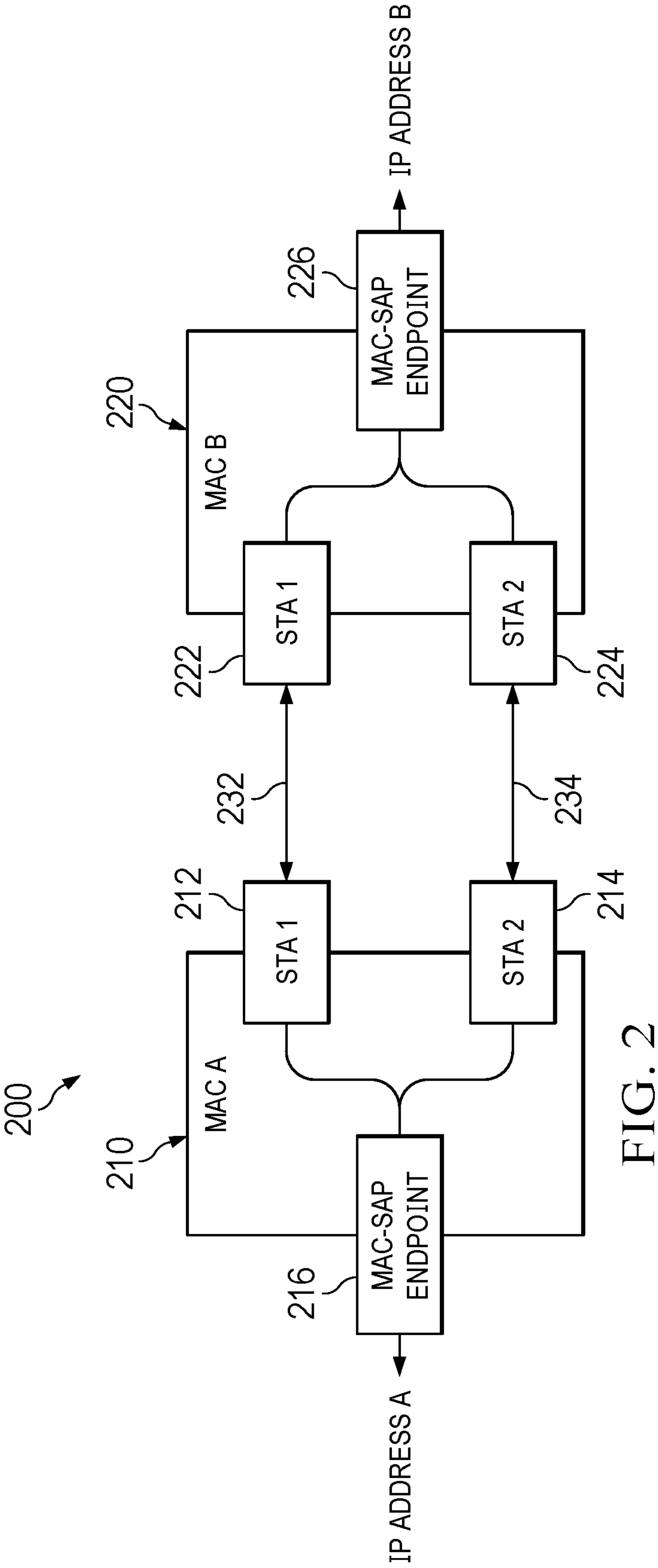
FIG. 2 is a diagram of an operating environment for transferring data, in accordance with various examples.

FIG. 2 is a diagram of an operating environment 200 for exchanging data, in accordance with various examples. Operating environment 200 includes a wireless local area network (WLAN) 202 having a wireless transmission medium. WLAN 202 may operate in accordance with a wireless communication standard such as any communication standard in the IEEE 802.11 family of communication standards. In accordance with the wireless communication standard, wireless devices (e.g., communication system 100) may operate in WLAN 202 to establish links over different channels of the wireless transmission medium to exchange data between the wireless devices in the form of packets or messages.

Each channel can include a bandwidth that generally represents a range of frequencies within a given band of a radio frequency (RF) spectrum. Links may be established between wireless devices in the WLAN 202 over channels in different frequency bands of the RF spectrum. The different frequency bands of the RF spectrum may include a 2.4 gigahertz (GHz) band, a 5 GHz band, a 6 GHz band, or other frequency bands. Links may be established between wireless devices in the WLAN 202 over channels having different bandwidths. For example, a first link can be established over a first channel having a first bandwidth of 20 megahertz (MHz) and a second link can be established over a second channel having a second bandwidth of 40 MHz, 80 MHz, or 160 MHz bandwidth.

Channel conditions may dynamically vary over frequency and over time in WLAN 202. For example, channel conditions in WLAN 202 may degrade responsive to interference created by various devices operating in different frequencies of the RF spectrum proximate to channel frequencies of WLAN 202. Some devices creating interference may include devices that operate external to WLAN 202, such as microwave ovens, wireless headsets, cordless phones, and other devices that operate in frequencies of the RF spectrum proximate to channel frequencies of WLAN 202. Some devices creating interference may also include devices that operate within WLAN 202, such as wireless devices exchanging data on links established over different channels of WLAN 202.

WLAN 202 may support numerous wireless devices that each contend for access to different channels of the wireless transmission medium to exchanging data. Wireless devices may assess channel conditions with probing transmissions before transmitting data to evaluate link quality, tune various transmission parameters of a link, or otherwise adapt link operation to account for channel conditions.

The wireless communication standard of WLAN 202 may include a Quality of Service (QoS) feature that controls channel access to mitigate packet collisions and other events that may degrade performance of WLAN 202 in terms of throughput, latency, jitter, packet loss, power consumption, and other performance metrics. A transmit opportunity (TXOP) is a QoS feature of the IEEE 802.11 communication standards that provides a wireless device with contention-free access to a particular channel for a limited period of time. The TEEE 802.11 communication standards also provide different channel access protocols (e.g., an enhanced distributed channel access (EDCA) protocol) with various access categories that establish relative priority among different transmission types.

The numerous wireless devices that WLAN 202 supports may include one or more MLDs. As described above, an MLD is a wireless device that may be configured to support ML operation or parallel transmission of data over different channels of a wireless transmission medium. An MLD may include multiple STAs that each provide the MLD with a different PHY interface to the wireless transmission medium. Accordingly, an MLD with multiple STAs may be configured to establish multiple links with each link being established over a different channel of a wireless transmission medium. Some MLDs may be configured to support asynchronous ML operation where different links of an MLD independently exchange data such that temporal overlap may exist between uplink transmissions and downlink transmissions on the different links. Some MLDs may be configured to support synchronous ML operation where different links of an MLD coordinate data exchanges to reduce temporal overlap between uplink transmissions and downlink transmissions on the different links. For example, uplink and downlink transmissions may be scheduled on the different links without any temporal overlap or with reduced temporal overlap between respective transmission intervals of the uplink and downlink transmissions. An MLD also includes a single LLC coupled to each STA of the MLD to manage ML operations in a centralized manner. One aspect of managing ML operations in a centralized manner may involve providing medium access control (MAC) to coordinate access to channels of a wireless transmission medium for uplink or downlink transmissions.

In FIG. 2, WLAN 202 supports two MLDs: MLD 210 that includes first STA 212, second STA 214, and LLC 216; and MLD 220 that includes first STA 222, second STA 224, and LLC 226. In at least one example, first STA 212, second STA 214, first STA 222, and second STA 224 may operate in a physical layer of the open systems interconnection model (OSI model). In at least one example, LLC 216 and LLC 226 may operate in a data link layer of the OSI model. In accordance with the wireless communication standard of WLAN 202, first link 232 and second link 234 can be established between MLD 210 and MLD 220. First link 232 can be established between first STA 212 of MLD 210 and first STA 222 of MLD 220 over a first channel of the wireless transmission medium of WLAN 202. Second link 234 can be established between second STA 214 of MLD 210 and second STA 224 of MLD 220 over a second channel of the wireless transmission medium of WLAN 202.

First link 232 and second link 234 may be different in a frequency domain. In at least one example, the first channel corresponding to first link 232 and the second channel corresponding to second link 234 may be different channels in different frequency bands of the RF spectrum. For example, the first channel corresponding to first link 232 may be in the 5 GHz band of the RF spectrum while the second channel corresponding to second link 234 may be in the 6 GHz band of the RF spectrum. In at least one example, the first channel corresponding to first link 232 and the second channel corresponding to second link 234 may be different channels in the same frequency band of the RF spectrum. For example, the first channel corresponding to first link 232 and the second channel corresponding to second link 234 may each be in the 5 GHz band of the RF spectrum. In at least one example, first link 232 can include a first bandwidth (e.g., a 40 MHz bandwidth) and second link 234 can include a second bandwidth (e.g., an 80 MHz bandwidth) that is different from the first bandwidth.

MLD 210 and MLD 220 may each be configured to exchange packets on first link 232 and on second link 234 during ML operation. Packets that MLD 210 and MLD 220 exchange may include routing information, such as a source MAC address and a destination MAC address. For example, a packet that MLD 210 transmits to MLD 220 may include a source MAC address that uniquely identifies LLC 216 and a destination MAC address that uniquely identifies LLC 226. Another example, a packet that MLD 220 transmits to MLD 210 may include a source MAC address that uniquely identifies LLC 226 and a destination MAC address that uniquely identifies LLC 216.

In an example operation, MLD 210 may be configured to generate data for transmission to MLD 220. Prior to transmitting data to MLD 220, MLD 210 may be configured to perform synchronized ML channel assessment to select one or more links for transmitting the data. To that end, MLD 210 may generate probe packets for transmission to MLD 220 on first link 232 and on second link 234. Each probe packet generated by MLD 210 may correspond to a different set of transmission parameters. Example transmission parameters can include: a modulation and coding scheme (MCS), such as binary phase shift keying (BPSK), quadrature phase shift keying (QPSK), quadrature amplitude modulation (QAM), or any other suitable MCS; transmission power; bit rate; packet format; and other suitable transmission parameters. In at least one example, the probe packets may include a physical layer protocol data unit (PPDU). In at least one example, the probe packets may include a QoS null packet.

MLD 210 may be configured to select a particular transmission parameter set for transmitting each probe packet from a number of programmed transmission parameter sets stored in memory (e.g., memory 102). In at least one example, the memory storing the programmed transmission parameter sets can include memory resources that are external to MLD 210, such as memory resources provided by cloud storage, network-attached storage, and direct-attached storage. Each transmission parameter set stored in the memory can include a different combination of transmission parameters. For example, first and second transmission parameter sets stored in the memory may each include the same transmission format, the same bit rate, and the same MCS. In this example, the first transmission parameter set may further include a first transmission power and the second transmission parameter set may further include a second transmission power that is higher than the first transmission power. In at least one example, MLD 210 may be configured to store a transmission parameter set selected for transmitting a particular probe packet in memory (e.g., memory 102) for use with later transmissions.

MLD 210 may be configured to perform ML channel assessment by transmitting probe packets to MLD 220 on multiple links with synchronous transmissions on the multiple links, as described below. Operating environment 200 shows an example in which MLD 210 may perform ML channel assessment with synchronous transmissions on two links: first link 232 and second link 234. In other examples, MLD 210 may perform ML channel assessment with synchronous transmissions on more (e.g., three) links. To initiate ML channel assessment, MLD 210 may transmit probe packets to MLD 220 with synchronous transmissions of probe packets on first link 232 by first STA 212 and on second link 234 by second STA 214.

A synchronous transmission of probe packets from MLD 210 to MLD 220 may include first STA 212 and second STA 214 transmitting duplicate or different probe packets on first link 232 and on second link 234, respectively. A synchronous transmission of probe packets first MLD 210 to MLD 220 may also include first STA 212 and second STA 214 transmitting probe packets on first link 232 and on second link 234, respectively, with the same transmission parameter set or with different transmission parameter sets. In at least one example, LLC 216 may be configured to synchronize the respective transmissions of probe packets by first STA 212 on first link 232 and by second STA 214 on second link 234. To synchronize the respective transmissions of probe packets by first STA 212 and by second STA 214, LLC 216 may synchronize respective: transmission start times, transmission end times, or transmission intervals.

MLD 220 may be configured to transmit, responsive to MLD 210 transmitting probe packets on first link 232 and on second link 234 with synchronous transmissions, feedback to MLD 210 on first link 232 and on second link 234 in tandem with the synchronous transmissions. Examples of feedback that MLD 220 transmits to MLD 210 may include: an ACK, a NACK, a packet that includes CSI regarding a channel associated with a link, or other forms of feedback that provides information supporting channel assessment. In at least one example, feedback that MLD 220 transmits to MLD 210 can include explicit feedback such as CSI that directly characterizes one or more channel conditions at a corresponding link. In at least one example, feedback that MLD 220 transmits to MLD 210 can include implicit feedback, such as an ACK or a NACK, that indirectly characterizes one or more channel conditions at a corresponding link. One aspect of MLD 220 transmitting feedback to MLD 210 in tandem with synchronous transmissions of probe packets by MLD 210 may involve mitigating temporal overlap between the feedback and the probe packets on first link 232 and on second link 234.

Another aspect of MLD 220 transmitting feedback to MLD 210 in tandem with synchronous transmissions of probe packets by MLD 210 may involve refreshing channel condition information for both first link 232 and second link 234 at the same rate. For example, MLD 210 may transmit probe packets to MLD 220 with first and second synchronous transmissions on first link 232 and second link 234. In this example, the first synchronous transmission of probe packets may occur after the second synchronous transmission of probe packets. MLD 210 may receive first feedback from MLD 220 between the first and second synchronous transmissions of probe packets. The first feedback that MLD 210 receives from MLD 220 may be indicative of channel condition information for both first link 232 and second link 234 at some time between the first and second synchronous transmissions of probe packets. In aggregate, the probe packets that MLD 210 transmits to MLD 220 with the first synchronous transmissions and the first feedback that MLD 210 receives from MLD 220 may represent a first probing exchange between MLD 210 and MLD 220. MLD 210 may also receive second feedback from MLD 220 after the second synchronous transmission of probe packets. The second feedback that MLD 210 receives from MLD 220 may be indicative of channel condition information for both first link 232 and second link 234 at some time after the second synchronous transmission of probe packets. In aggregate, the probe packets that MLD 210 transmits to MLD 220 with the second synchronous transmissions and the second feedback that MLD 210 receives from MLD 220 may represent a second probing exchange between MLD 210 and MLD 220.

Each probing exchange between MLD 210 and MLD 220 may represent a synchronous refresh of channel condition information for both first link 232 and second link 234 at MLD 210. The first feedback that MLD 210 receives in the first probing exchange may provide MLD 210 with a first snapshot of channel condition information for both first link 232 and second link 234 at some time between the first and second synchronous transmissions of probe packets. The second feedback that MLD 210 receives in the second probing exchange may provide MLD 210 with a second snapshot of channel condition information for both first link 232 and second link 234 at some time after the second synchronous transmission of probe packets.

MLD 210 may be configured to analyze the second feedback for simultaneous or substantially simultaneous assessment of channel conditions at first link 232 and at second link 234 after the second synchronous transmission of probe packets. Responsive to analyzing the second feedback, MLD 210 may select a preferred link from among first link 232 and second link 234 for a subsequent transmission. Alternatively, MLD 210 may initiate, responsive to analyzing the second feedback, a third probing exchange between MLD 210 and MLD 220 by transmitting probe packets to MLD 220 with a third synchronous transmission on first link 232 and on second link 234. Third feedback that MLD 210 receives from MLD 220 in the third probing exchange may provide MLD 210 with an updated snapshot of channel condition information for both first link 232 and second link 234 at some time after the third synchronous transmission. In at least one example, first MLD 210 may be configured to continue initiating additional probing exchanges with MLD 220 until convergence is achieved in first link 232 or in second link 234.

MLD 210 may be configured to transmit, responsive to selecting a preferred link from among first link 232 and second link 234 for subsequent transmissions, one or more packets to MLD 220 with asynchronous transmissions on the preferred link (e.g., first link 232). MLD 210 may also be configured to cease, responsive to selecting the preferred link for subsequent transmissions, transmitting packets to MLD 220 on a non-preferred link (e.g., second link 234). As described below, the packets that MLD 210 transmits to MLD 220 with asynchronous transmissions on the preferred link may include one or more probe packets where each probe packet includes a different set of transmission parameters. MLD 210 may receive feedback from MLD 220 responsive to MLD 210 transmitting probe packets with asynchronous transmissions on the preferred link. MLD 210 may select a transmission parameter set for subsequent transmissions on the preferred link based on such feedback. As described below, the packets that MLD 210 transmits to MLD 220 with asynchronous transmissions on the preferred link may also include data.

Figure 3:
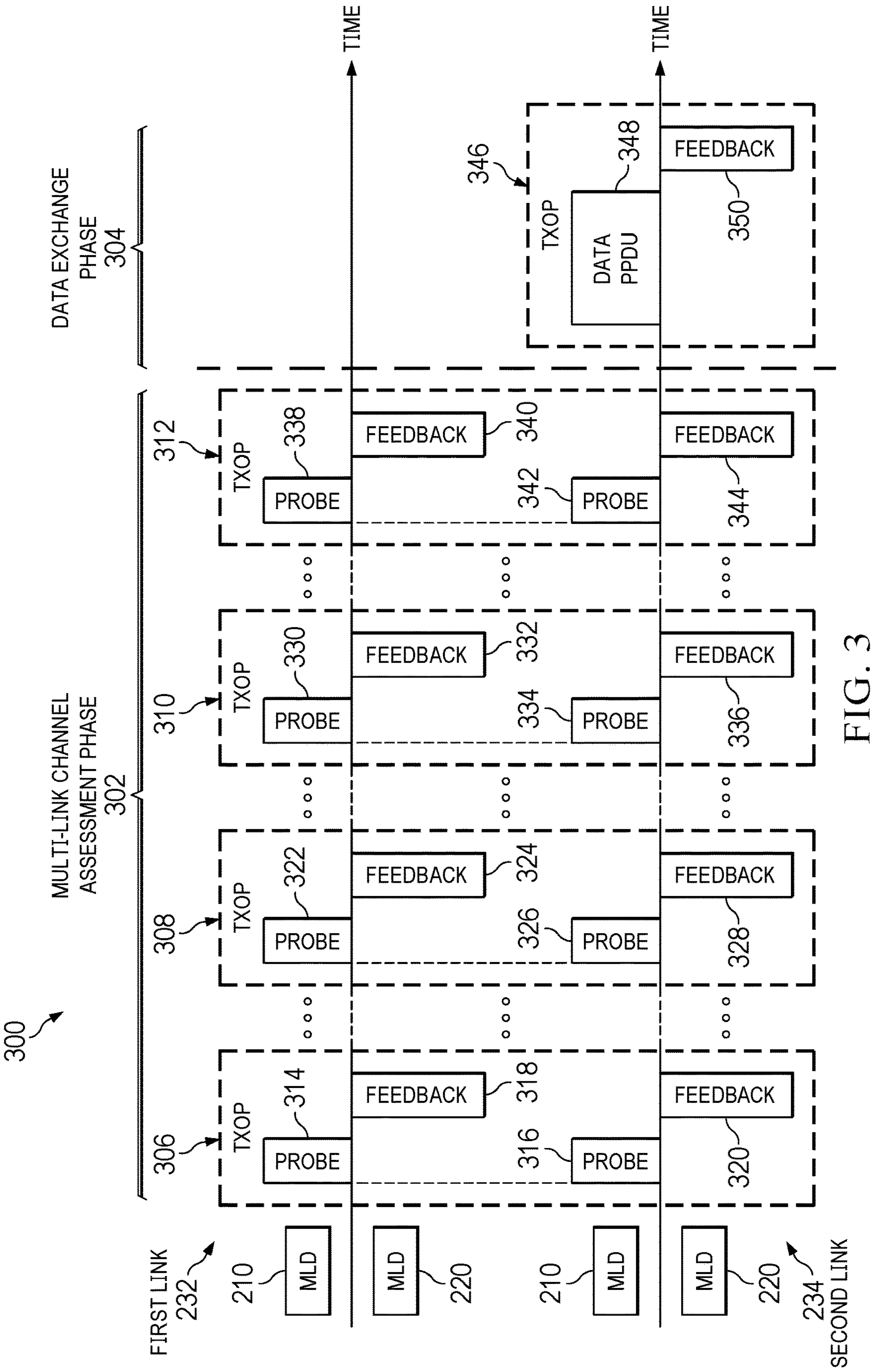
FIG. 3 is a timing diagram of link selection, in accordance with various examples.

FIG. 3 is a timing diagram 300 of link selection during multi-link (ML) operation, in accordance with various examples. Timing diagram 300 includes ML channel assessment phase 302 in which MLD 210 transmits probe packets to MLD 220 with synchronous probing transmissions on multiple links. Each probe packet that MLD 210 transmits in ML channel assessment phase 302 may correspond to a different set of transmission parameters. In data exchange phase 304, MLD 210 transmits data on a preferred link that MLD 210 selects from among the multiple links based on various feedback received in ML channel assessment phase 302. In the example of timing diagram 300, the multiple links include two links: first link 232 and second link 234. In other examples, the multiple links can include more (e.g., three) links.

To initiate ML channel assessment phase 302, MLD 210 transmits probe packet 314 on first link 232 and probe packet 316 on second link 234 to MLD 220 during TXOP 306. Timing diagram 300 shows that probe packets 314 and 316 represent synchronous probing transmissions inasmuch as temporal overlap exists between the respective transmission intervals of probe packets 314 and 316. For example, a transmission start time of probe packet 314 on first link 232 may coincide or substantially coincide with a transmission start time of probe packet 316 on second link 234. Another example, a transmission end time of probe packet 314 on first link 232 may coincide or substantially coincide with a transmission end time of probe packet 316 on second link 234. Another example, a transmission interval of probe packet 314 on first link 232 may coincide or substantially coincide with a transmission interval of probe packet 316 on second link 234. As described above, MLD 210 transmitting probe packets to MLD 220 with synchronous transmissions on first link 232 and on second link 234 may involve LLC 216 synchronizing respective probe packet transmission start times, end times, or transmission intervals.

A synchronous probing transmission by MLD 210 in ML channel assessment phase 302 may include duplicate probe packets or different probe packets. For example, probe packets 314 and 316 composing the synchronous probing transmission by MLD 210 in TXOP 306 may be duplicate probe packets or different probe packets. Probe packets of a given synchronous probing transmission in ML channel assessment phase 302 may be transmitted by MLD 210 using the same set of transmission parameters or using different sets of transmission parameters. For example, probe packets 314 and 316 of the synchronous probing transmission in TXOP 306 may be transmitted by MLD 210 using the same set of transmission parameters or using different sets of transmission parameters.

MLD 210 receives, responsive to transmitting probe packet 314 on first link 232, feedback 318 from MLD 220 on first link 232 during TXOP 306. MLD 210 also receives, responsive to transmitting probe packet 316 on second link 234, feedback 320 from MLD 220 on second link 234 during TXOP 306. Examples of feedback that MLD 210 receives in ML channel assessment phase 302 may include: an ACK, a NACK, a packet that includes CSI regarding a channel associated with a link, or other forms of feedback that provides information supporting channel assessment.

MLD 210 transmitting probe packet 314 to MLD 220 on first link 232 and MLD 210 receiving feedback 318 from MLD 220 on first link 232 responsive to transmitting probe packet 314 can collectively represent a probe exchange between MLD 210 and MLD 220 on first link 232 during TXOP 306. MLD 210 transmitting probe packet 316 to MLD 220 on second link 234 and MLD 210 receiving feedback 320 from MLD 220 on second link 234 responsive to transmitting probe packet 316 can collectively represent a probe exchange between MLD 210 and MLD 220 on second link 234 during TXOP 306. In aggregate, the probe exchange between MLD 210 and MLD 220 on first link 232 during TXOP 306 along with the probe exchange between MLD 210 and MLD 220 on second link 234 during TXOP 306 can represent an ML probe exchange between MLD 210 and MLD 220 during TXOP 306. The ML probe exchange between MLD 210 and MLD 220 during TXOP 306 can represent a synchronous ML probe exchange inasmuch as probe packets 314 and 316 represent synchronous probing transmissions.

Timing diagram 300 shows multiple (e.g., four) iterations of synchronous ML probe exchanges between MLD 210 and MLD 220 in ML channel assessment phase 302. In addition to the synchronous ML probe exchange iteration in TXOP 306, ML channel assessment phase 302 includes synchronous ML probe exchange iterations in TXOPs 308, 310, and 312. The synchronous ML probe exchange iteration in TXOP 308 includes a first probe exchange on first link 232 and a second probe exchange on second link 234. The first probe exchange on first link 232 in TXOP 308 involves: MLD 210 transmitting probe packet 322 to MLD 220; and MLD 210 receiving feedback 324 from MLD 220 responsive to probe packet 322. The second probe exchange on second link 234 in TXOP 308 involves: MLD 210 transmitting probe packet 326 to MLD 220; and MLD 210 receiving feedback 328 from MLD 220 responsive to probe packet 326.

The synchronous ML probe exchange iteration in TXOP 310 includes a first probe exchange on first link 232 and a second probe exchange on second link 234. The first probe exchange on first link 232 in TXOP 310 involves: MLD 210 transmitting probe packet 330 to MLD 220; and MLD 210 receiving feedback 332 from MLD 220 responsive to probe packet 330. The second probe exchange on second link 234 in TXOP 310 involves: MLD 210 transmitting probe packet 334 to MLD 220; and MLD 210 receiving feedback 336 from MLD 220 responsive to probe packet 334. The synchronous ML probe exchange iteration in TXOP 312 includes a first probe exchange on first link 232 and a second probe exchange on second link 234. The first probe exchange on first link 232 in TXOP 312 involves: MLD 210 transmitting probe packet 338 to MLD 220; and MLD 210 receiving feedback 340 from MLD 220 responsive to probe packet 338. The second probe exchange on second link 234 in TXOP 312 involves: MLD 210 transmitting probe packet 342 to MLD 220; and MLD 210 receiving feedback 344 from MLD 220 responsive to probe packet 342.

Timing diagram 300 shows that MILD 210 receives, responsive to transmitting probe packets (e.g., probe packets 314, 316, 322, 326, 330, 334, 338, and 342), feedback from MLD 220 on multiple links (e.g., first link 232 and second link 234) in tandem with the synchronous probing transmissions over TXOPs 306, 308, 310, and 312. As described above, one aspect of receiving the feedback on the multiple links in tandem with the synchronous transmissions can involve receiving the feedback without temporal overlap between the feedback and the synchronous transmissions on the multiple links. For example, a transmission start time of feedback 318 by MILD 220 on first link 232 in TXOP 306 is after a transmission end time of probe packet 314 by MLD 210 on first link 232 and after a transmission end time of probe packet 316 by MLD 210 on second link 234 in TXOP 306. As another example, a transmission interval of feedback 324 by MILD 220 on first link 232 is between respective transmission intervals of successive probe packets (e.g., probe packets 322 and 330) by MLD 210 on first link 232. In at least one example, temporal overlap may exist between feedback that MLD 210 receives on different links. For example, temporal overlap may exist between feedback 318 and feedback 320 that MLD 210 receives on first link 232 and second link 234, respectively. In this example, respective transmission intervals of feedback 318 and feedback 320 that MLD 210 receives on first link 232 and second link 234, respectively, may partially or fully overlap in a time domain.

After receiving feedback 340 and feedback 344, MLD 210 analyzes the various feedback received in ML channel assessment phase 302 and selects a preferred link from among first link 232 and second link 234 based on that feedback. In timing diagram 300, MLD 210 analyzes the various feedback received in ML channel assessment phase 302, and selects second link 234 as the preferred link. MLD 210 transmits data to MLD 220 on second link 234 as the preferred link during TXOP 346 in data exchange phase 304. FIG. 3 represents the data that MLD 210 transmits to MLD 220 during TXOP 346 as data PPDU 348. MLD 210 transmitting data PPDU 348 to MLD 220 on second link 234 during TXOP 346 without any corresponding transmission on first link 232 during TXOP 346 can represent an asynchronous transmission (e.g., an asynchronous data transmission) by MLD 210 to MLD 220 on second link 234 during TXOP 346.

In at least one example, MLD 210 analyzes the various feedback received in ML channel assessment phase 302 and selects a transmission parameter set for transmitting packets on the preferred link in data exchange phase 304 based on that feedback. For example, MLD 210 may receive an ACK for feedback 336 responsive to transmitting packet 334 with a first transmission parameter set, while MLD 210 may receive a NACK for feedback 344 responsive to transmitting packet 342 with a second transmission parameter set. In this example, MLD 210 may transmit data PPDU 348 to MLD 220 on second link 234 with the first transmission parameter set. MLD 210 may receive, responsive to transmitting data PPDU 348, feedback 350 from MLD 220. In at least one example, MLD 210 may be configured to store feedback 350 in memory (e.g., memory 102) for use with later transmissions. In at least one example, TXOPs 306, 308, 310, and 312 each represent a synchronous TXOP (S-TXOP) inasmuch as MLD 210 obtains contention-free access to both first link 232 and second link 234 in timing diagram 300 during TXOPs 306, 308, 310, and 312.

Figure 4:
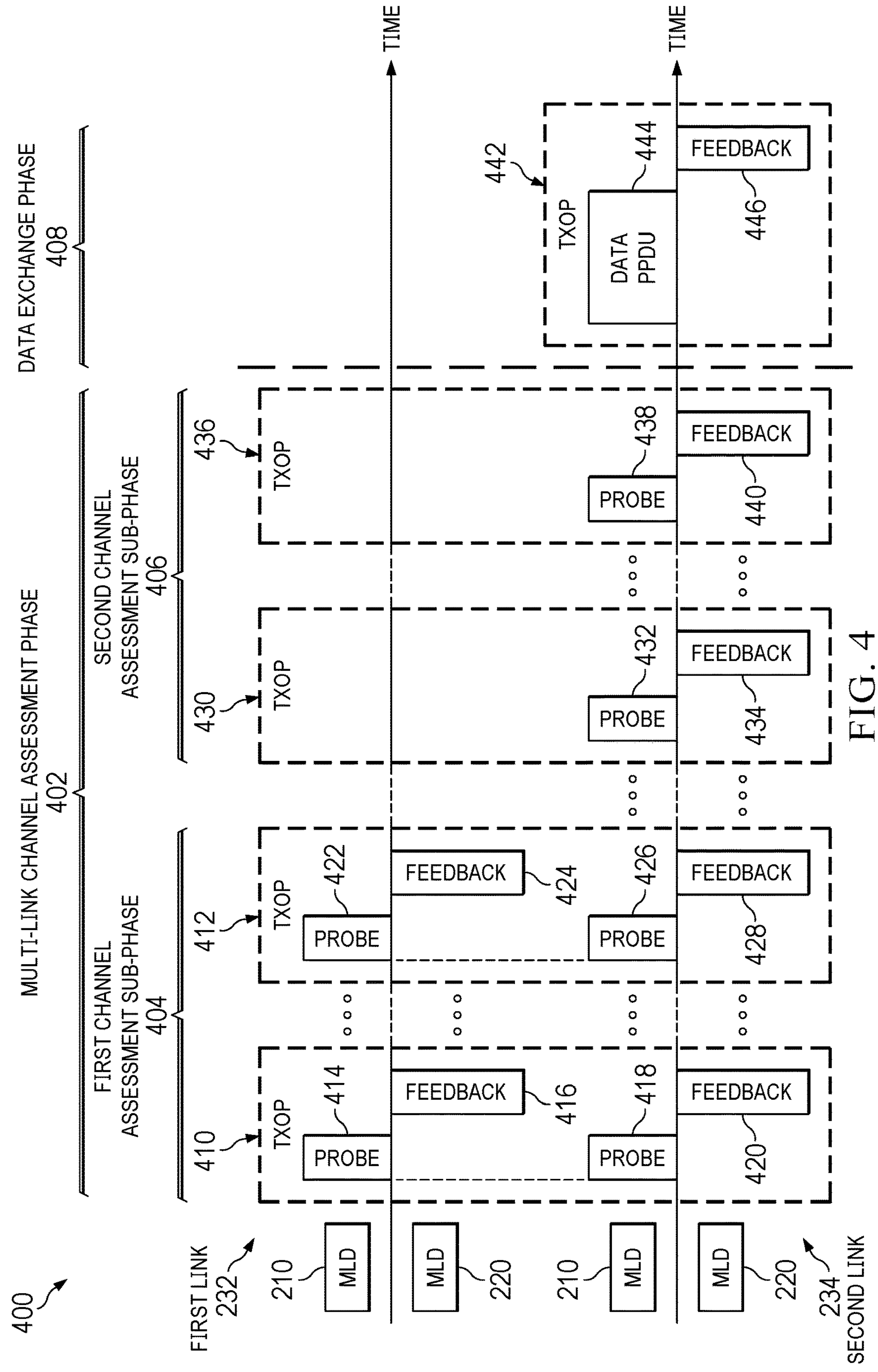
FIG. 4 is a timing diagram of link selection and transmission parameter, in accordance with various examples.

FIG. 4 is a timing diagram 400 of link selection and transmission parameter tuning during ML operation, in accordance with various examples. ML channel assessment phase 402 of timing diagram 400 includes first channel assessment sub-phase 404 and second channel assessment sub-phase 406. In first channel assessment sub-phase 404, MLD 210 evaluates channel conditions at multiple links in parallel by transmitting probe packets to MLD 220 with synchronous probing transmissions on the multiple links. MLD 210 selects a preferred link (e.g., a subset of the multiple links) based on various feedback that MLD 210 receives from MLD 220 in first channel assessment sub-phase 404. In second channel assessment sub-phase 406, MLD 210 evaluates efficacy of different transmission parameters at the preferred link by transmitting probe packets to MLD 220 with asynchronous probing transmissions on the preferred link. MLD 210 selects a transmission parameter set for transmitting data packets on the preferred link in data exchange phase 408 based on various feedback that MLD 210 receives from MLD 220 in ML channel assessment phase 402. In the example of timing diagram 400, the multiple links include two links: first link 232 and second link 234. In other examples, the multiple links can include more (e.g., three) links.

First channel assessment sub-phase 404 includes two iterations of synchronous ML probe exchanges between MLD 210 and MLD 220: a first synchronous ML probe exchange iteration in TXOP 410; and a second synchronous ML probe exchange iteration in TXOP 412. The first synchronous ML probe exchange iteration in TXOP 410 includes a first probe exchange between MLD 210 and MLD 220 on first link 232 that involves: MLD 210 transmitting probe packet 414 to MLD 220; and MLD 210 receiving feedback 416 from MLD 220 responsive to transmitting probe packet 414. The first synchronous ML probe exchange iteration in TXOP 410 also includes a second probe exchange on second link 234 that involves: MLD 210 transmitting probe packet 418 to MLD 220; and MLD 210 receiving feedback 420 from MLD 220 responsive to transmitting probe packet 418. The second synchronous ML probe exchange iteration in TXOP 412 includes a first probe exchange between MLD 210 and MLD 220 on first link 232 that involves: MLD 210 transmitting probe packet 422 to MLD 220; and MLD 210 receiving feedback 424 from MLD 220 responsive to transmitting probe packet 422. The second synchronous ML probe exchange iteration in TXOP 412 also includes a second probe exchange on second link 234 that involves: MLD 210 transmitting probe packet 426 to MLD 220; and MLD 210 receiving feedback 428 from MLD 220 responsive to transmitting probe packet 426. In at least one example, temporal overlap may exist between feedback that MLD 210 receives on different links. For example, temporal overlap may exist between feedback 416 and feedback 420 that MLD 210 receives on first link 232 and second link 234, respectively. In this example, respective transmission intervals of feedback 416 and feedback 420 that MLD 210 receives on first link 232 and second link 234, respectively, may partially or fully overlap in a time domain.

After receiving feedback 424 and feedback 428, MLD 210 analyzes the various feedback received in first channel assessment sub-phase 404 and selects a preferred link from among first link 232 and second link 234 based on that feedback. In timing diagram 400, MLD 210 analyzes the various feedback received in first channel assessment sub-phase 404 and selects second link 234 as the preferred link. Prior to selecting a preferred link from among first link 232 and second link 234, MLD 210 may be configured to identify a substandard link based on the various feedback received in first channel assessment sub-phase 404. For example, MLD 210 may analyze the various feedback received in first channel assessment sub-phase 404 and identify first link 232 as the substandard link. In this example, MLD 210 may exclude first link 232 from consideration when selecting a preferred link.

After MLD 210 selects second link 234 as the preferred link, second channel assessment sub-phase 406 commences in TXOP 430 with MLD 210 transmitting probe packet 432 to MLD 220. MLD 210 transmitting probe packet 432 to MLD 220 on second link 234 during TXOP 430 without any corresponding transmission on first link 232 during TXOP 430 can represent an asynchronous transmission (e.g., an asynchronous probing transmission) by MLD 210 to MLD 220 on second link 234 during TXOP 430. Second channel assessment sub-phase 406 includes multiple (e.g., two) TXOPS during which MLD 210 transmits probe packets to MLD 220 with asynchronous probing transmissions on second link 234 after selecting second link 234 as the preferred link. In addition to the asynchronous probing transmission of probe packet 432 during TXOP 430, second channel assessment sub-phase 406 also includes an asynchronous probing transmission of probe packet 438 on second link 234 by MLD 210 to MLD 220 during TXOP 436. In some examples, second channel assessment sub-phase 406 can include more (e.g., three) TXOPs during which MLD 210 transmits a probe packet to MLD 220 with an asynchronous probing transmission on second link 234 as the preferred link.

MLD 210 receives, responsive to transmitting probe packets with asynchronous probing transmissions on second link 234, feedback (e.g., feedback 434 and 440) from MLD 220 on second link 234 in tandem with the asynchronous probing transmission over TXOPs 430 and 436. One aspect of receiving feedback on a preferred link in tandem with the asynchronous probing transmissions on the preferred link can involve receiving the feedback without temporal overlap between the feedback and the asynchronous probing transmissions on the preferred link. For example, a transmission start time of feedback 434 on second link 234 is after a transmission end time of probe packet 432 on second link 234. As another example, a transmission interval of feedback 434 by MLD 220 on second link 234 is between respective transmission intervals of successive probing transmissions (e.g., probe packets 432 and 438) by MLD 210 on second link 234.

In aggregate, MLD 210 transmitting probe packet 432 to MLD 220 with an asynchronous probing transmission on second link 234 during TXOP 430 and MLD 210 receiving feedback 434 from MLD 220 on second link 234 responsive to that asynchronous probing transmission may represent an iteration of an asynchronous probe exchange between MLD 210 and MLD 220 on second link 234 during TXOP 430. Timing diagram 400 includes another iteration of an asynchronous probe exchange between MLD 210 and MLD 220 in TXOP 436. The asynchronous probe exchange iteration in TXOP 436 includes: MLD 210 transmitting probe packet 438 to MLD 220 with an asynchronous probing transmission on second link 234; and MLD 210 receiving feedback 440 from MLD 220 on second link 234 responsive to that asynchronous probing transmission.

After receiving feedback 440, MLD 210 may analyze the various feedback received in ML channel assessment phase 402 and select a transmission parameter set for transmitting packets to MLD 220 during TXOP 442 in data exchange phase 408. For example, MLD 210 may receive an ACK for feedback 440 responsive to transmitting packet 438 with a first transmission parameter set, while MLD 210 may receive a NACK for feedback 434 responsive to transmitting packet 432 with a second transmission parameter set. In this example, MLD 210 may transmit data PPDU 444 to MLD 220 on second link 234 during TXOP 442 with the first transmission parameter set in data exchange phase 408. MLD 210 may receive, responsive to transmitting data PPDU 444, feedback 446 from MLD 220. In at least one example, MLD 210 may be configured to store feedback 446 in memory (e.g., memory 102) for use with later transmissions.

A synchronous probing transmission by MLD 210 in first channel assessment sub-phase 404 may include duplicate probe packets or different probe packets. For example, probe packets 414 and 418 composing the synchronous probing transmission by MLD 210 in TXOP 410 may be duplicate probe packets or different probe packets. Probe packets of a given synchronous probing transmission in first channel assessment sub-phase 404 may be transmitted by MLD 210 using the same set of transmission parameters or using different sets of transmission parameters. For example, probe packets 414 and 418 of the synchronous probing transmission in TXOP 410 may be transmitted by MLD 210 using the same set of transmission parameters. Another example, probe packets 422 and 426 of the synchronous probing transmission in TXOP 412 may be transmitted by MLD 210 using different sets of transmission parameters. In at least one example, TXOPs 410, 412, 430, and 436 each represent an S-TXOP inasmuch as MLD 210 obtains contention-free access to both first link 232 and second link 234 in timing diagram 400 during TXOPs 410, 412, 430, and 436.

Figure 5:
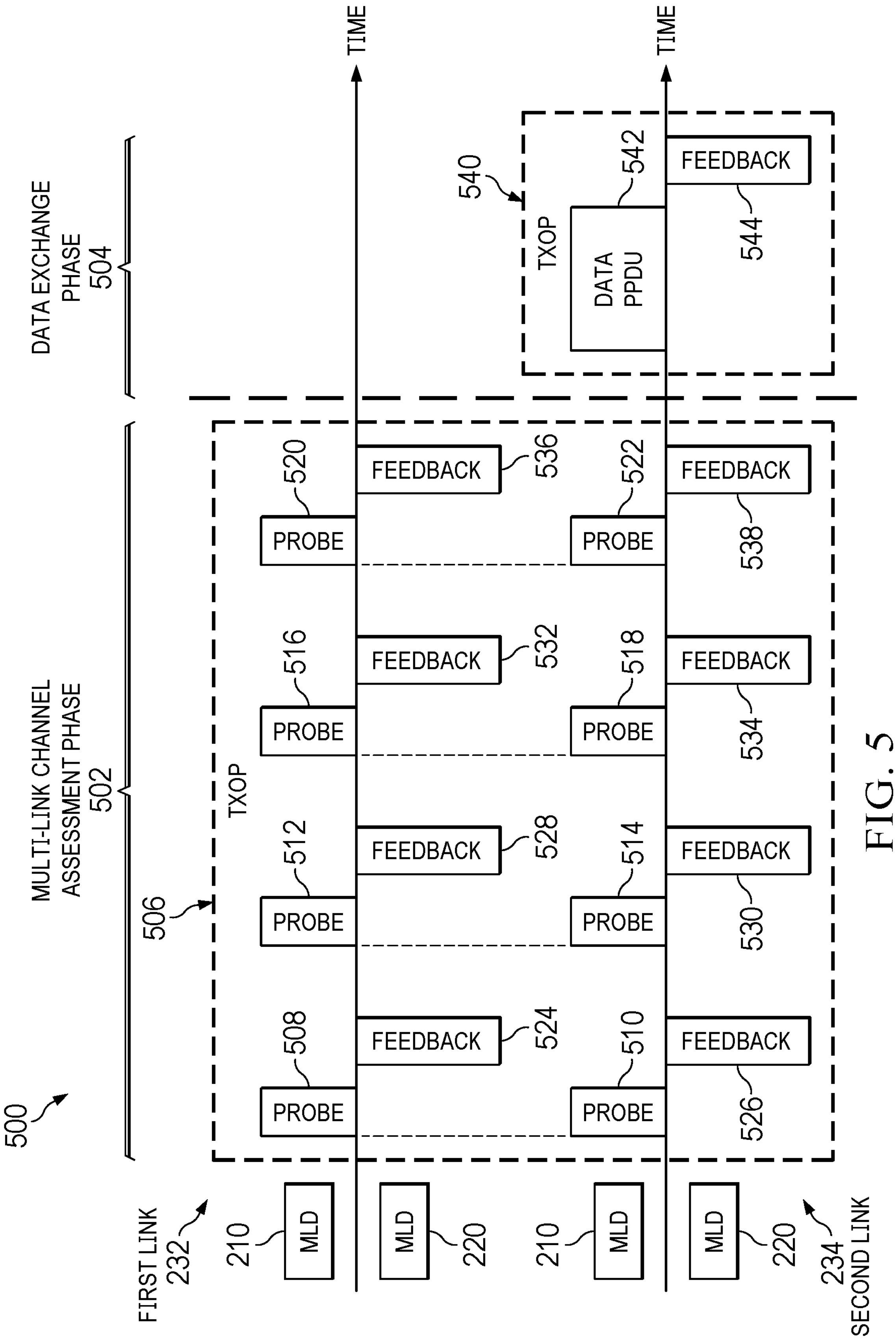
FIG. 5 is a timing diagram of link selection, in accordance with various examples.

FIG. 5 is a timing diagram 500 of link selection during multi-link (ML) operation, in accordance with various examples. Timing diagram 500 includes ML channel assessment phase 502 and data exchange phase 504. MLD 210 evaluates channel conditions at multiple links in parallel during ML channel assessment phase 502 by transmitting probe packets to MLD 220 with multiple synchronous probing transmissions on the multiple links in a single TXOP—TXOP 506. MLD 210 selects a preferred link (e.g., a subset of the multiple links) for transmissions in data exchange phase 504 based on various feedback that MLD 210 receives from MLD 220 in ML channel assessment phase 502. In the example of timing diagram 500, the multiple links include two links: first link 232 and second link 234. In other examples, the multiple links can include more (e.g., three) links.

ML channel assessment phase 502 includes four synchronous probing transmissions by MLD 210 within a duration of TXOP 506: a first synchronous probing transmission that includes probe packet 508 on first link 232 and probe packet 510 on second link 234; a second synchronous probing transmission that includes probe packet 512 on first link 232 and probe packet 514 on second link 234; a third synchronous probing transmission that includes probe packet 516 on first link 232 and probe packet 518 on second link 234; and a fourth synchronous probing transmission that includes probe packet 520 on first link 232 and probe packet 522 on second link 234. In at least one example, ML channel assessment phase 502 may include less (e.g., three) synchronous probing transmissions or more (e.g., five) synchronous probing transmissions.

A synchronous probing transmission by MLD 210 in ML channel assessment phase 502 may include duplicate probe packets or different probe packets. For example, probe packets 508 and 510 composing the first synchronous probing transmission by MLD 210 in TXOP 506 may be duplicate probe packets or different probe packets. Probe packets of a given synchronous probing transmission in ML channel assessment phase 502 may be transmitted by MLD 210 using the same set of transmission parameters or using different sets of transmission parameters. For example, probe packets 512 and 514 of the second synchronous probing transmission in TXOP 506 may be transmitted by MLD 210 using the same set of transmission parameters or using different sets of transmission parameters.

The four synchronous probing transmissions in ML channel assessment phase 502 includes MLD 210 transmitting multiple probe packets (e.g. probe packets 508, 512, 516, and 520) to MLD 220 on first link 232 within the duration of TXOP 506. In aggregate, the multiple probe packets that MLD 210 transmits to MLD 220 on first link 232 within the duration of TXOP 506 may represent a first burst transmission by MLD 210 to MLD 220 on first link 232 in TXOP 506. The four synchronous probing transmissions in ML channel assessment phase 502 also includes MLD 210 transmitting multiple probe packets (e.g. probe packets 510, 514, 518, and 522) to MLD 220 on second link 234 within the duration of TXOP 506. In aggregate, the multiple probe packets that MLD 210 transmits to MLD 220 on second link 234 within the duration of TXOP 506 may represent a second burst transmission by MLD 210 to MLD 220 on second link 234 in TXOP 506.

Timing diagram 500 shows that the first and second burst transmissions by MLD 210 to MLD 220 on first link 232 and second link 234, respectively, represent synchronous burst transmissions inasmuch as temporal overlap exists between transmissions of probe packets on first link 232 and transmissions of probe packets on second link 234 in TXOP 506. For example, a transmission start time of probe packet 508 on first link 232 may coincide or substantially coincide with a transmission start time of probe packet 510 on second link 234. Another example, a transmission end time of probe packet 512 on first link 232 may coincide or substantially coincide with a transmission end time of probe packet 514 on second link 234. Another example, a transmission interval of probe packet 516 on first link 232 may coincide or substantially coincide with a transmission interval of probe packet 518 on second link 234. As described above, MILD 210 transmitting probe packets to MILD 220 with synchronous transmissions on first link 232 and on second link 234 may involve LLC 216 synchronizing respective probe packet transmission start times, end times, or transmission intervals.

Timing diagram 500 also shows that MLD 210 receives, responsive to transmitting probe packets (e.g., probe packets 508, 510, 512, 514, 516, 518, 520, and 520) to MLD 220 as synchronous burst transmissions on multiple links (e.g., first link 232 and second link 234) in TXOP 506, feedback (e.g., feedback 524, 526, 528, 530, 532, 534, 536, and 538) from MLD 220 on the multiple links in tandem with the synchronous burst transmissions in TXOP 506. As described above, one aspect of receiving the feedback on the multiple links in tandem with the synchronous transmissions can involve receiving the feedback without temporal overlap between the feedback and the synchronous transmissions on the multiple links. For example, a transmission start time of feedback 524 by MLD 220 on first link 232 in TXOP 506 is after a transmission end time of probe packet 508 by MLD 210 on first link 232 and after a transmission end time of probe packet 510 by MLD 210 on second link 234 in TXOP 506. As another example, a transmission interval of feedback 526 by MLD 220 on first link 232 is between respective transmission intervals of successive probe packets (e.g., probe packets 510 and 514) by MLD 210 on first link 232 in TXOP 506. In at least one example, temporal overlap may exist between feedback that MLD 210 receives on different links. For example, temporal overlap may exist between feedback 524 and feedback 526 that MLD 210 receives on first link 232 and second link 234, respectively. In this example, respective transmission intervals of feedback 524 and feedback 526 that MLD 210 receives on first link 232 and second link 234, respectively, may partially or fully overlap in a time domain.

After receiving feedback 536 and feedback 538, MLD 210 analyzes the various feedback received in ML channel assessment phase 502 and selects a preferred link from among first link 232 and second link 234 based on that feedback. In timing diagram 500, MLD 210 analyzes the various feedback received in ML channel assessment phase 502, and selects second link 234 as the preferred link. MLD 210 transmits data to MLD 220 on second link 234 as the preferred link during TXOP 540 in data exchange phase 504. FIG. 5 represents the data that MLD 210 transmits to MLD 220 during TXOP 540 as data PPDU 542. MLD 210 transmitting data PPDU 542 to MLD 220 on second link 234 during TXOP 540 without any corresponding transmission on first link 232 during TXOP 540 can represent an asynchronous transmission (e.g., an asynchronous data transmission) by MLD 210 to MLD 220 on second link 234 during TXOP 540.

In at least one example, MILD 210 analyzes the various feedback received in ML channel assessment phase 502 and selects a transmission parameter set for transmitting packets on the preferred link in data exchange phase 504 based on that feedback. For example, MLD 210 may receive a NACK for feedback 536 responsive to transmitting packet 520 with a first transmission parameter set, while MLD 210 may receive an ACK for feedback 538 responsive to transmitting packet 522 with a second transmission parameter set. In this example, MLD 210 may transmit data PPDU 542 to MLD 220 on second link 234 with the second transmission parameter set. MLD 210 may receive, responsive to transmitting data PPDU 542, feedback 544 from MLD 220. In at least one example, MLD 210 may be configured to store feedback 544 in memory (e.g., memory 102) for use with later transmissions. In at least one example, TXOP 506 represents an S-TXOP inasmuch as MLD 210 obtains contention-free access to both first link 232 and second link 234 in timing diagram 500 during TXOP 506.

Figure 6:
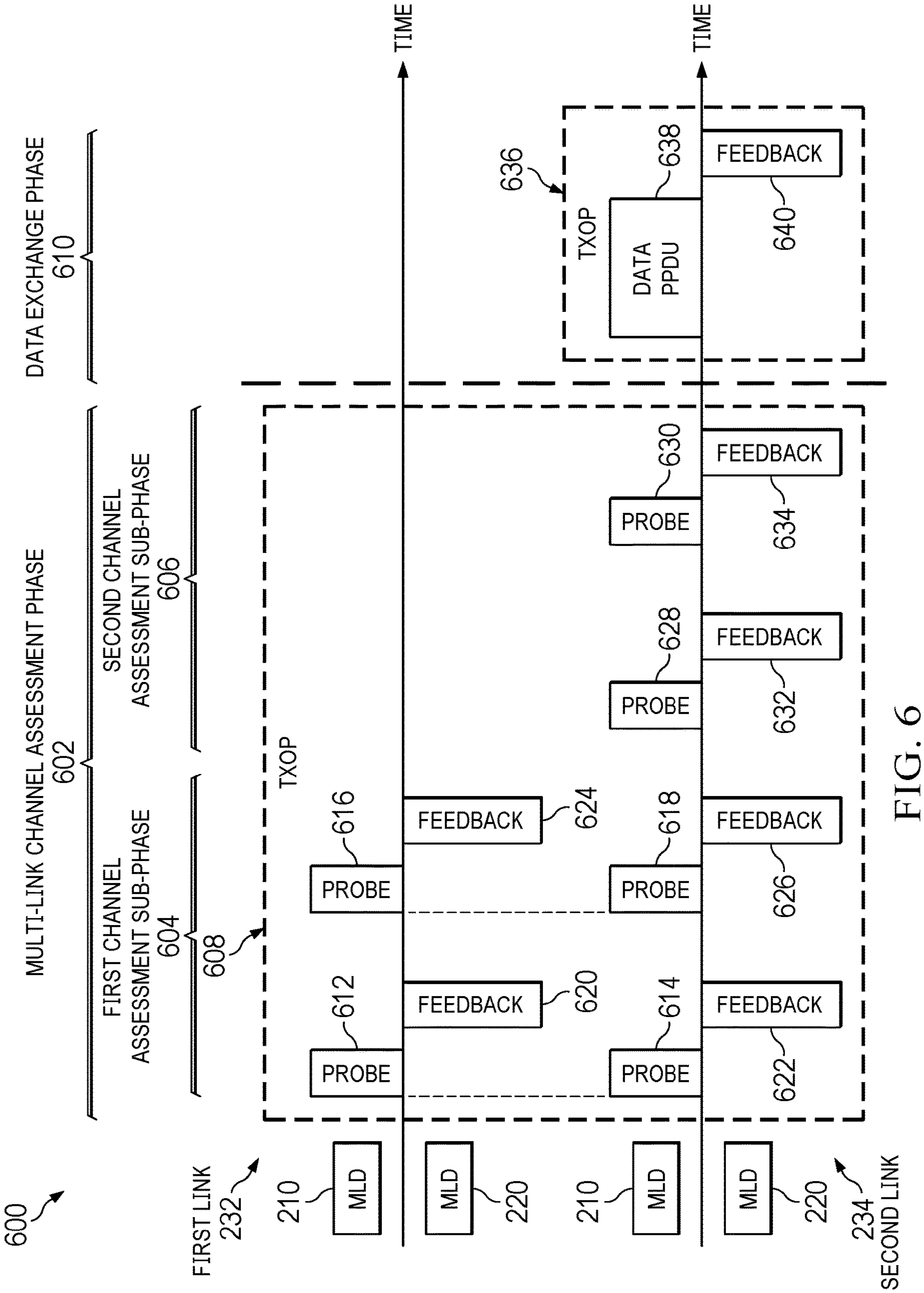
FIG. 6 is a timing diagram of link selection and transmission parameter tuning, in accordance with various examples.

FIG. 6 is a timing diagram 600 of link selection and transmission parameter tuning during ML operation, in accordance with various examples. ML channel assessment phase 602 of timing diagram 600 includes first channel assessment sub-phase 604 and second channel assessment sub-phase 606. In first channel assessment sub-phase 604, MLD 210 evaluates channel conditions at multiple links in parallel by transmitting probe packets to MLD 220 as synchronous burst transmissions on the multiple links in a single TXOP—TXOP 608. MLD 210 selects a preferred link (e.g., a subset of the multiple links) based on various feedback that MLD 210 receives from MLD 220 in first channel assessment sub-phase 604. Within a duration of TXOP 608, MLD 210 evaluates efficacy of different transmission parameters at the preferred link by transmitting probe packets to MLD 220 on the preferred link. MLD 210 selects a transmission parameter set for transmitting data packets on the preferred link in data exchange phase 610 based on various feedback that MLD 210 receives from MLD 220 in ML channel assessment phase 602. In the example of timing diagram 600, the multiple links include two links: first link 232 and second link 234. In other examples, the multiple links can include more (e.g., three) links.

First channel assessment sub-phase 604 includes two synchronous probing transmissions by MLD 210 within a duration of TXOP 608: a first synchronous probing transmission that includes probe packet 612 on first link 232 and probe packet 614 on second link 234; and a second synchronous probing transmission that includes probe packet 616 on first link 232 and probe packet 618 on second link 234. In at least one example, first channel assessment sub-phase 604 may include more (e.g., three) synchronous probing transmissions. A synchronous probing transmission by MLD 210 in first channel assessment sub-phase 604 may include duplicate probe packets or different probe packets. For example, probe packets 612 and 614 composing the first synchronous probing transmission by MILD 210 in TXOP 608 may be duplicate probe packets or different probe packets. Probe packets of a given synchronous probing transmission in first channel assessment sub-phase 604 may be transmitted by MLD 210 using the same set of transmission parameters or using different sets of transmission parameters. For example, probe packets 616 and 618 of the second synchronous probing transmission in TXOP 608 may be transmitted by MLD 210 using the same set of transmission parameters or using different sets of transmission parameters.

The two synchronous probing transmissions in first channel assessment sub-phase 604 includes MILD 210 transmitting multiple probe packets (e.g. probe packets 612 and 616) to MLD 220 on first link 232 within the duration of TXOP 608. In aggregate, the multiple probe packets that MLD 210 transmits to MLD 220 on first link 232 within the duration of TXOP 608 may represent a first burst transmission by MLD 210 to MLD 220 on first link 232 in TXOP 608. The two synchronous probing transmissions in first channel assessment sub-phase 604 also includes MILD 210 transmitting multiple probe packets (e.g. probe packets 614 and 618) to MLD 220 on second link 234 within the duration of TXOP 608. In aggregate, the multiple probe packets that MLD 210 transmits to MILD 220 on second link 234 within the duration of TXOP 608 may represent a second burst transmission by MLD 210 to MLD 220 on second link 234 in TXOP 608.

Timing diagram 600 shows that the first and second burst transmissions by MLD 210 to MLD 220 on first link 232 and second link 234, respectively, represent synchronous burst transmissions inasmuch as temporal overlap exists between transmissions of probe packets on first link 232 and transmissions of probe packets on second link 234 in TXOP 608. For example, a transmission start time of probe packet 612 on first link 232 may coincide or substantially coincide with a transmission start time of probe packet 614 on second link 234. Another example, a transmission end time of probe packet 616 on first link 232 may coincide or substantially coincide with a transmission end time of probe packet 618 on second link 234. Another example, a transmission interval of probe packet 612 on first link 232 may coincide or substantially coincide with a transmission interval of probe packet 614 on second link 234. As described above, MILD 210 transmitting probe packets to MILD 220 with synchronous transmissions on first link 232 and on second link 234 may involve LLC 216 synchronizing respective probe packet transmission start times, end times, or transmission intervals.

Timing diagram 600 also shows that MLD 210 receives, responsive to transmitting probe packets (e.g., probe packets 612, 614, 616, and 618) to MLD 220 as synchronous burst transmissions on multiple links (e.g., first link 232 and second link 234) in first channel assessment sub-phase 604, feedback (e.g., feedback 620, 622, 624, and 626) from MLD 220 on the multiple links in tandem with the synchronous burst transmissions in first channel assessment sub-phase 604. As described above, one aspect of receiving feedback on multiple links in tandem with synchronous transmissions on the multiple links can involve receiving the feedback without temporal overlap between the feedback and the synchronous transmissions on the multiple links. For example, a transmission start time of feedback 624 by MLD 220 on first link 232 in first channel assessment sub-phase 604 is after a transmission end time of probe packet 616 by MLD 210 on first link 232 and after a transmission end time of probe packet 618 by MLD 210 on second link 234 in first channel assessment sub-phase 604. As another example, a transmission interval of feedback 620 by MLD 220 on first link 232 is between respective transmission intervals of successive probe packets (e.g., probe packets 612 and 616) by MLD 210 on first link 232 in first channel assessment sub-phase 604. In at least one example, temporal overlap may exist between feedback that MLD 210 receives on different links. For example, temporal overlap may exist between feedback 620 and feedback 622 that MLD 210 receives on first link 232 and second link 234, respectively. In this example, respective transmission intervals of feedback 620 and feedback 622 that MLD 210 receives on first link 232 and second link 234, respectively, may partially or fully overlap in a time domain.

After receiving feedback 624 and feedback 626, MLD 210 analyzes the various feedback received in first channel assessment sub-phase 604 and selects a preferred link from among first link 232 and second link 234 based on that feedback. In timing diagram 600, MLD 210 analyzes the various feedback received in first channel assessment sub-phase 604, and selects second link 234 as the preferred link. Prior to selecting a preferred link from among first link 232 and second link 234, MLD 210 may be configured to identify a substandard link based on the various feedback received in first channel assessment sub-phase 604. For example, MLD 210 may analyze the various feedback received in first channel assessment sub-phase 604 and identify first link 232 as the substandard link. In this example, MLD 210 may exclude first link 232 from consideration when selecting a preferred link.

After MILD 210 selects second link 234 as the preferred link, second channel assessment sub-phase 606 commences in TXOP 608 with MLD 210 transmitting probe packet 628 to MLD 220. MLD 210 transmitting probe packet 628 to MLD 220 on second link 234 during TXOP 608 without any corresponding transmission on first link 232 during TXOP 608 can represent an asynchronous transmission (e.g., an asynchronous probing transmission) by MLD 210 to MLD 220 on second link 234 during TXOP 608. MLD 210 also transmits probe packet 630 to MLD 220 on second link 234 during TXOP 608 without any corresponding transmission on first link 232, which represents another asynchronous probing transmission by MLD 210 to MLD 220 on second link 234 during TXOP 608. With probe packets 628 and 630 each representing an asynchronous probing transmissions by MLD 210 to MLD 220 on second link 234 within a duration of a single TXOP (e.g., TXOP 608), probe packets 628 and 630 collectively may represent an asynchronous burst transmission by MLD 210 to MLD 220 on second link 234 in TXOP 608.

MLD 210 receives, responsive to transmitting probe packets (e.g., probe packets 628 and 630) to MLD 220 with asynchronous burst transmissions on second link 234 in TXOP 608, feedback (e.g., feedback 632 and 634) from MLD 220 on second link 234 in tandem with the asynchronous burst transmissions on second link 234 in TXOP 608. One aspect of receiving feedback on a preferred link in tandem with asynchronous probing transmissions on the preferred link can involve receiving the feedback without temporal overlap between the feedback and the asynchronous probing transmissions on the preferred link. For example, a transmission start time of feedback 634 on second link 234 is after a transmission end time of probe packet 630 on second link 234. As another example, a transmission interval of feedback 632 by MLD 220 on second link 234 is between respective transmission intervals of successive probing transmissions (e.g., probe packets 628 and 630) by MLD 210 on second link 234.

After receiving feedback 634, MLD 210 may analyze the various feedback received in ML channel assessment phase 602 and select a transmission parameter set for transmitting packets to MLD 220 during TXOP 636 in data exchange phase 610. For example, MLD 210 may receive an ACK for feedback 632 responsive to transmitting packet 628 with a first transmission parameter set, while MLD 210 may receive a NACK for feedback 634 responsive to transmitting packet 630 with a second transmission parameter set. In this example, MLD 210 may transmit data PPDU 638 to MLD 220 on second link 234 during TXOP 636 with the first transmission parameter set in data exchange phase 610. MLD 210 may receive, responsive to transmitting data PPDU 638, feedback 640 from MLD 220. In at least one example, MLD 210 may be configured to store feedback 640 in memory (e.g., memory 102) for use with later transmissions. In at least one example, TXOP 608 represents an S-TXOP inasmuch as MLD 210 obtains contention-free access to both first link 232 and second link 234 in timing diagram 600 during TXOP 608.

Figure 7:
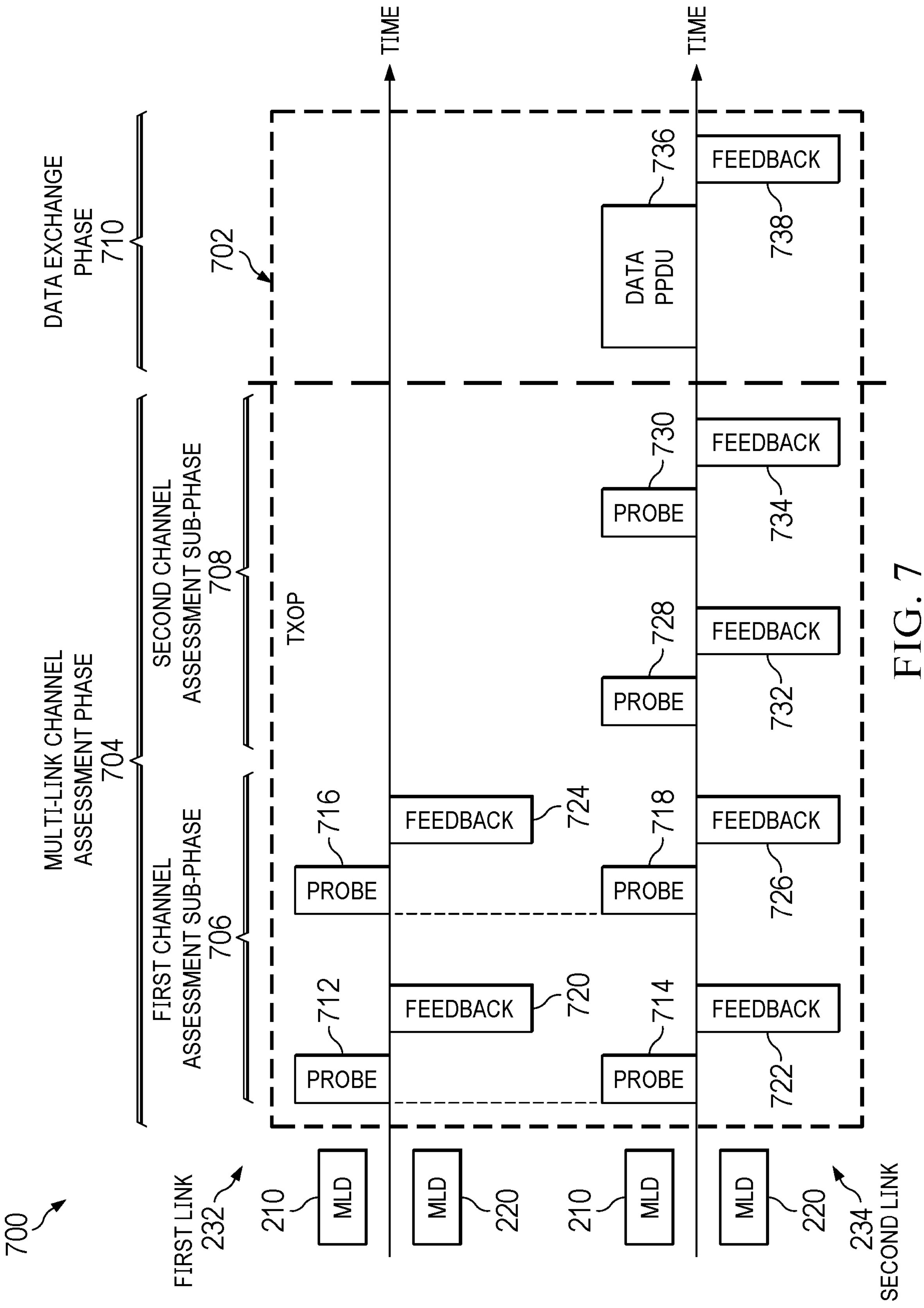
FIG. 7 is a timing diagram of link selection and transmission parameter tuning, in accordance with various examples.

FIG. 7 is a timing diagram 700 of link selection and transmission parameter tuning during ML operation, in accordance with various examples. Timing diagram 700 shows an example in which MLD 210 may be configured to transition from selecting a preferred link with probe packets to selecting a transmission parameter set for transmissions on the preferred link with probe packets to transmitting data on the preferred link with the selected transmission parameter set within a single TXOP—TXOP 702. Within a duration of TXOP 702, MLD 210 may be configured to implement ML channel assessment phase 704 that includes first channel assessment sub-phase 706 and second channel assessment sub-phase 708. Within the duration of TXOP 702, MLD 210 may also be configured to implement data exchange phase 710.

First channel assessment sub-phase 706 includes two synchronous probing transmissions by MLD 210 within the duration of TXOP 702: a first synchronous probing transmission that includes probe packet 712 on first link 232 and probe packet 714 on second link 234; and a second synchronous probing transmission that includes probe packet 716 on first link 232 and probe packet 718 on second link 234. In at least one example, first channel assessment sub-phase 706 may include more (e.g., three) synchronous probing transmissions. A synchronous probing transmission by MLD 210 in first channel assessment sub-phase 706 may include duplicate probe packets or different probe packets. For example, probe packets 712 and 714 composing the first synchronous probing transmission by MLD 210 in TXOP 702 may be duplicate probe packets or different probe packets. Probe packets of a given synchronous probing transmission in first channel assessment sub-phase 706 may be transmitted by MLD 210 using the same set of transmission parameters or using different sets of transmission parameters. For example, probe packets 716 and 718 of the second synchronous probing transmission in TXOP 702 may be transmitted by MLD 210 using the same set of transmission parameters or using different sets of transmission parameters.

The two synchronous probing transmissions in first channel assessment sub-phase 706 includes MLD 210 transmitting multiple probe packets (e.g. probe packets 712 and 716) to MLD 220 on first link 232 within the duration of TXOP 702. In aggregate, probe packets 712 and 716 that MLD 210 transmits to MLD 220 on first link 232 within the duration of TXOP 702 may represent a first burst transmission by MLD 210 to MLD 220 on first link 232 in TXOP 702. The two synchronous probing transmissions in first channel assessment sub-phase 706 also includes MILD 210 transmitting multiple probe packets (e.g. probe packets 714 and 718) to MLD 220 on second link 234 within the duration of TXOP 702. In aggregate, probe packets 714 and 718 that MILD 210 transmits to MILD 220 on second link 234 within the duration of TXOP 702 may represent a second burst transmission by MLD 210 to MLD 220 on second link 234 in TXOP 702.

In timing diagram 700, MLD 210 receives, responsive to transmitting probe packets (e.g., probe packets 712, 714, 716, and 718) to MLD 220 as synchronous burst transmissions on multiple links (e.g., first link 232 and second link 234) in first channel assessment sub-phase 706, feedback (e.g., feedback 720, 722, 724, and 726) from MLD 220 on the multiple links in tandem with the synchronous burst transmissions in first channel assessment sub-phase 706. As described above, one aspect of receiving feedback on multiple links in tandem with synchronous transmissions on the multiple links can involve receiving the feedback without temporal overlap between the feedback and the synchronous transmissions on the multiple links. For example, a transmission start time of feedback 724 by MLD 220 on first link 232 in first channel assessment sub-phase 706 is after a transmission end time of probe packet 716 by MLD 210 on first link 232 and after a transmission end time of probe packet 718 by MLD 210 on second link 234 in first channel assessment sub-phase 706. As another example, a transmission interval of feedback 720 by MLD 220 on first link 232 is between respective transmission intervals of successive probe packets (e.g., probe packets 712 and 716) by MLD 210 on first link 232 in first channel assessment sub-phase 706. In at least one example, temporal overlap may exist between feedback that MLD 210 receives on different links. For example, temporal overlap may exist between feedback 720 and feedback 722 that MLD 210 receives on first link 232 and second link 234, respectively. In this example, respective transmission intervals of feedback 720 and feedback 722 that MLD 210 receives on first link 232 and second link 234, respectively, may partially or fully overlap in a time domain.

After receiving feedback 724 and feedback 726, MLD 210 analyzes the various feedback received in first channel assessment sub-phase 706 and selects a preferred link from among first link 232 and second link 234 based on that feedback. In timing diagram 700, MLD 210 analyzes the various feedback received in first channel assessment sub-phase 706, and selects second link 234 as the preferred link. Prior to selecting a preferred link from among first link 232 and second link 234, MLD 210 may be configured to identify a substandard link based on the various feedback received in first channel assessment sub-phase 706. For example, MLD 210 may analyze the various feedback received in first channel assessment sub-phase 706 and identify first link 232 as the substandard link. In this example, MLD 210 may exclude first link 232 from consideration when selecting a preferred link.

After MLD 210 selects second link 234 as the preferred link, second channel assessment sub-phase 708 commences in TXOP 702 with MLD 210 transmitting probe packets (e.g., probe packets 728 and 730) to MLD 220 with asynchronous burst transmissions on second link 234.

MILD 210 receives, responsive to transmitting probe packets (e.g., probe packets 728 and 730) to MLD 220 with asynchronous burst transmissions on second link 234 in TXOP 702, feedback (e.g., feedback 732 and 734) from MLD 220 on second link 234 in tandem with the asynchronous burst transmissions on second link 234 in TXOP 702. One aspect of receiving feedback on a preferred link in tandem with asynchronous probing transmissions on the preferred link can involve receiving the feedback without temporal overlap between the feedback and the asynchronous probing transmissions on the preferred link. For example, a transmission start time of feedback 734 on second link 234 is after a transmission end time of probe packet 730 on second link 234. As another example, a transmission interval of feedback 732 by MLD 220 on second link 234 is between respective transmission intervals of successive probing transmissions (e.g., probe packets 728 and 730) by MLD 210 on second link 234.

After receiving feedback 734, MLD 210 may analyze the various feedback received in ML channel assessment phase 704 and select a transmission parameter set for transmitting packets to MLD 220 in data exchange phase 710. For example, MLD 210 may receive an ACK for feedback 732 responsive to transmitting packet 728 with a first transmission parameter set, while MLD 210 may receive a NACK for feedback 734 responsive to transmitting packet 730 with a second transmission parameter set. In this example, MLD 210 may transmit data PPDU 736 to MLD 220 on second link 234 with the first transmission parameter set in data exchange phase 710. MLD 210 may receive, responsive to transmitting data PPDU 736, feedback 738 from MLD 220. In at least one example, MLD 210 may be configured to store feedback 738 in memory (e.g., memory 102) for use with later transmissions. In at least one example, TXOP 702 represents an S-TXOP inasmuch as MLD 210 obtains contention-free access to both first link 232 and second link 234 in timing diagram 700 during TXOP 702.

Figure 8:
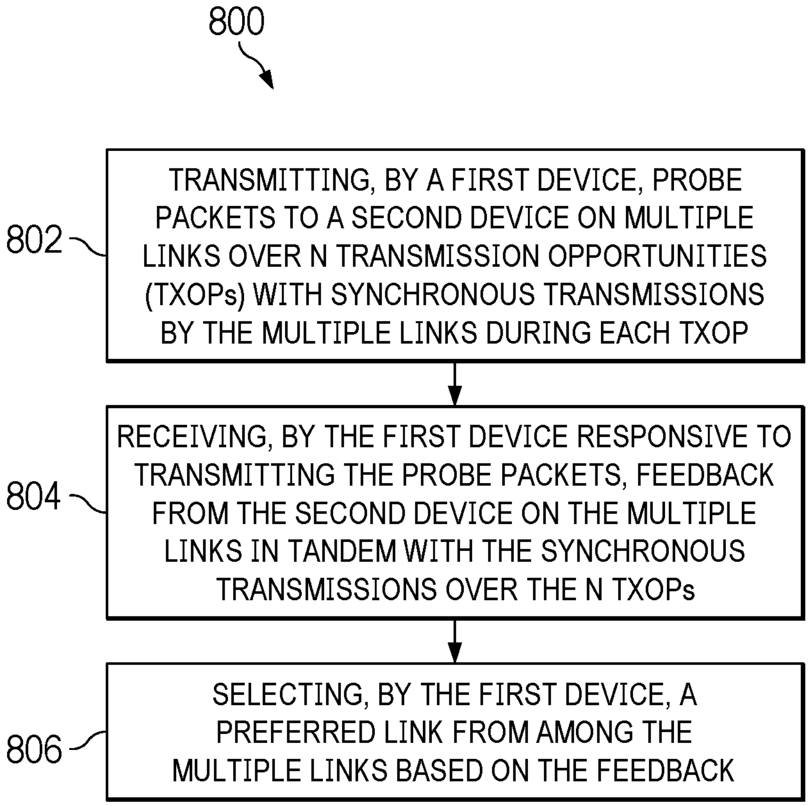
FIG. 8 is a flow diagram of a method for link selection, in accordance with various examples.

FIG. 8 is a flow diagram of a method 800 for simultaneous channel quality assessment and selection during ML operation, in accordance with various examples. Method 800 is performed by a first device configured to evaluate channel conditions at multiple links with synchronous probing transmissions to a second device. For example, MLD 210 may be configured to evaluate channel conditions at multiple links with synchronous probing transmissions to MLD 220. At step 802, a first device transmits probe packets to a second device on multiple links over N TXOPs with synchronous probing transmissions on the multiple links during each TXOP. N may be an integer value greater than 1. In at least one example, the N TXOPs may include a S-TXOP. Each probe packet that the first device transmits to the second device with synchronous probing transmissions may correspond to a different set of transmission parameters. Each link may be established between the first device and the second device over different channels of a wireless transmission medium. For example, MLD 210 transmits probe packet 314 and probe packet 316 to MLD 220 with synchronous probing transmissions on first link 232 and on second link 234, respectively, in FIG. 3 during TXOP 306. Another example, MLD 210 transmits probe packet 414 and probe packet 418 to MLD 220 with synchronous probing transmissions on first link 232 and on second link 234, respectively, in FIG. 4 during TXOP 410.

In at least one example, the first device may be configured to transmit duplicates of each probe packet to the second device with synchronous transmissions on the multiple links. In at least one example, the first device may be configured to select the same transmission parameter set for transmitting the duplicates of each probe packet to the second device. In at least one example, a common link layer controller of the first device may be configured to synchronize transmission start times among the multiple links. For example, LLC 216 of MLD 210 may be configured to synchronize: transmission start times; transmission end times; or both transmission start times and transmission end times.

At step 804, the first device receives, responsive to transmitting the probe packets, feedback from the second device on the multiple links in tandem with the synchronous probing transmissions over the N TXOPs. For example, MLD 210 receives, responsive to transmitting probe packet 314 and probe packet 316, feedback 318 and feedback 320 from MLD 220 on first link 232 and on second link 234, respectively, in tandem with the synchronous probing transmissions in FIG. 3 during TXOP 306. Another example, MLD 210 receives, responsive to transmitting probe packet 414 and probe packet 418, feedback 416 and feedback 420 from MLD 220 on first link 232 and on second link 234, respectively, in tandem with the synchronous probing transmissions in FIG. 4 during TXOP 410. At step 806, the first device selects a preferred link from among the multiple links based on the feedback. For example, MLD 210 selects second link 234 as a preferred link from among first link 232 and second link 234 based on various feedback received in FIG. 3 during ML channel assessment phase 302. Another example, MLD 210 selects second link 234 as a preferred link from among first link 232 and second link 234 based on various feedback received in FIG. 4 during first channel assessment sub-phase 404.

In at least one example, the first device may identify, prior to selecting the preferred link, a substandard link from among the multiple links based on the feedback. In this example, the first device may exclude the substandard link from consideration when selecting the preferred link. In at least one example, the first device may also select a transmission parameter set for transmissions on the preferred link based on the feedback. In at least one example, the first device may also transmit another probe packet to the second device during an N+1 TXOP with an asynchronous probing transmission on the preferred link. In at least one example, the first device may also transmit data to the second device during an N+1 TXOP with an asynchronous data transmission on the preferred link.

Figure 9:
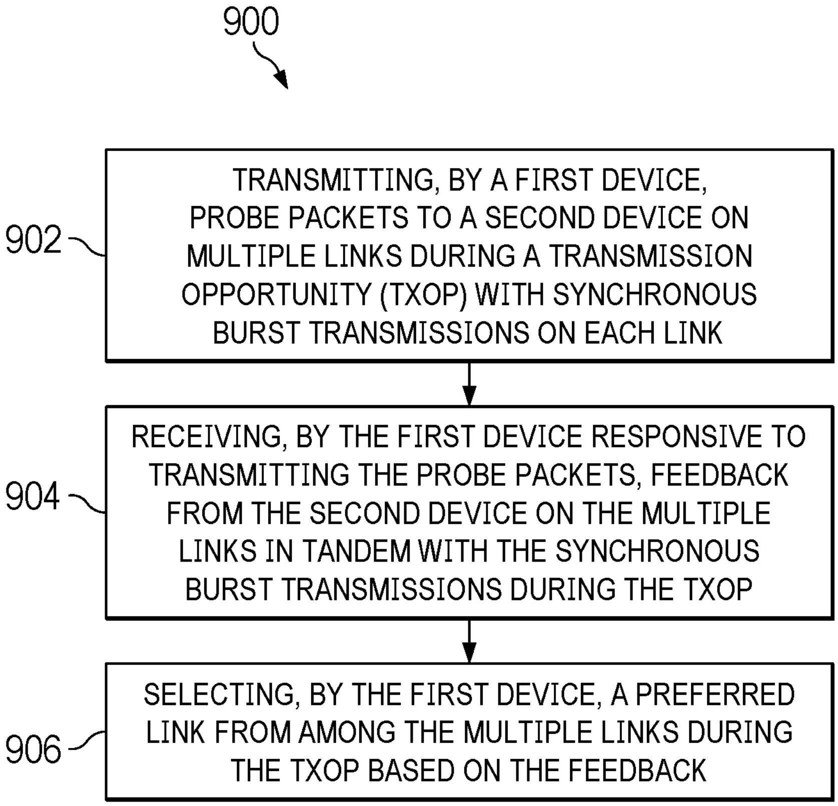
FIG. 9 is a flow diagram of a method for link selection, in accordance with various examples.

FIG. 9 is a flow diagram of a method 900 for simultaneous channel quality assessment and selection during ML operation, in accordance with various examples. Method 900 is performed by a first device configured to evaluate channel conditions at multiple links with synchronous burst transmissions to a second device. For example, MLD 210 may be configured to evaluate channel conditions at multiple links with synchronous burst transmissions to MLD 220. At step 902, a first device transmits probe packets to a second device as synchronous burst transmissions on multiple links during a TXOP. In at least one example, the TXOP may be a S-TXOP. Each probe packet that the first device transmits to the second device with synchronous burst transmissions may correspond to a different set of transmission parameters. Each link may be established between the first device and the second device over different channels of a wireless transmission medium. For example, MLD 210 transmits probe packets (e.g., probe packets 508, 510, 512, 514, 516, 518, 520, and 522) to MLD 220 as synchronous burst transmissions on first link 232 and second link 234, in FIG. 5 during TXOP 506. Another example, MLD 210 transmits probe packets (e.g., probe packets 612, 614, 616, and 618) to MLD 220 as synchronous burst transmissions on first link 232 and second link 234, in FIG. 6 during TXOP 608. Another example, MILD 210 transmits probe packets (e.g., probe packets 712, 714, 716, and 718) to MLD 220 as synchronous burst transmissions on first link 232 and second link 234, in FIG. 7 during TXOP 702.

At step 904, the first device receives, responsive to transmitting the probe packets, feedback from the second device on the multiple links in tandem with the synchronous burst transmissions during the TXOP. For example, MILD 210 receives, responsive to transmitting the probe packets (e.g., probe packets 508, 510, 512, 514, 516, 518, 520, and 522) as synchronous burst transmissions, feedback (e.g., feedback 524, 526, 528, 530, 532, 534, 536, and 538) from MLD 220 on first link 232 and second link 234 in tandem with the synchronous burst transmissions in FIG. 5 during TXOP 506. Another example, MLD 210 receives, responsive to transmitting the probe packets (e.g., probe packets 612, 614, 616, and 618) as synchronous burst transmissions, feedback (e.g., feedback 620, 622, 624, and 626) from MLD 220 on first link 232 and second link 234 in tandem with the synchronous burst transmissions in FIG. 6 during TXOP 608. Another example, MLD 210 receives, responsive to transmitting probe packets (e.g., probe packets 712, 714, 716, and 718) as synchronous burst transmissions, feedback (e.g., feedback 720, 722, 724, and 726) from MLD 220 on first link 232 and second link 234 in tandem with the synchronous burst transmissions in FIG. 7 during TXOP 702.

At step 906, the first device selects a preferred link from among the multiple links during the TXOP based on the feedback. For example, MLD 210 selects second link 234 as a preferred link from among first link 232 and second link 234 based on various feedback received in FIG. 5 during TXOP 506. Another example, MLD 210 selects second link 234 as a preferred link from among first link 232 and second link 234 based on various feedback received in FIG. 6 during TXOP 608. Another example, MLD 210 selects second link 234 as a preferred link from among first link 232 and second link 234 based on various feedback received in FIG. 7 during TXOP 702.

In at least one example, the feedback includes an ACK that the second device transmits to the first device on a link of the multiple links between successive probing transmissions by the first device on the link. In at least one example, the first device may transmit another probe packet to the second device with an asynchronous transmission on the preferred link during the TXOP after selecting the preferred link. In at least one example, the first device may select, during the TXOP, a transmission parameter set for transmissions on the preferred link based on the feedback. In at least one example, the first device may transmit data to the second device with an asynchronous transmission on the preferred link during the TXOP. In at least one example, the first device may transmit the data to the second device with the asynchronous transmission on the preferred link during the TXOP after selecting the transmission parameter set. In at least one example, each probe packet includes a source MAC address that uniquely identifies a common link layer controller of the first device. In at least one example, each probe packet includes a unique sequence number that is generated from a common sequence number space.

Figure 10:
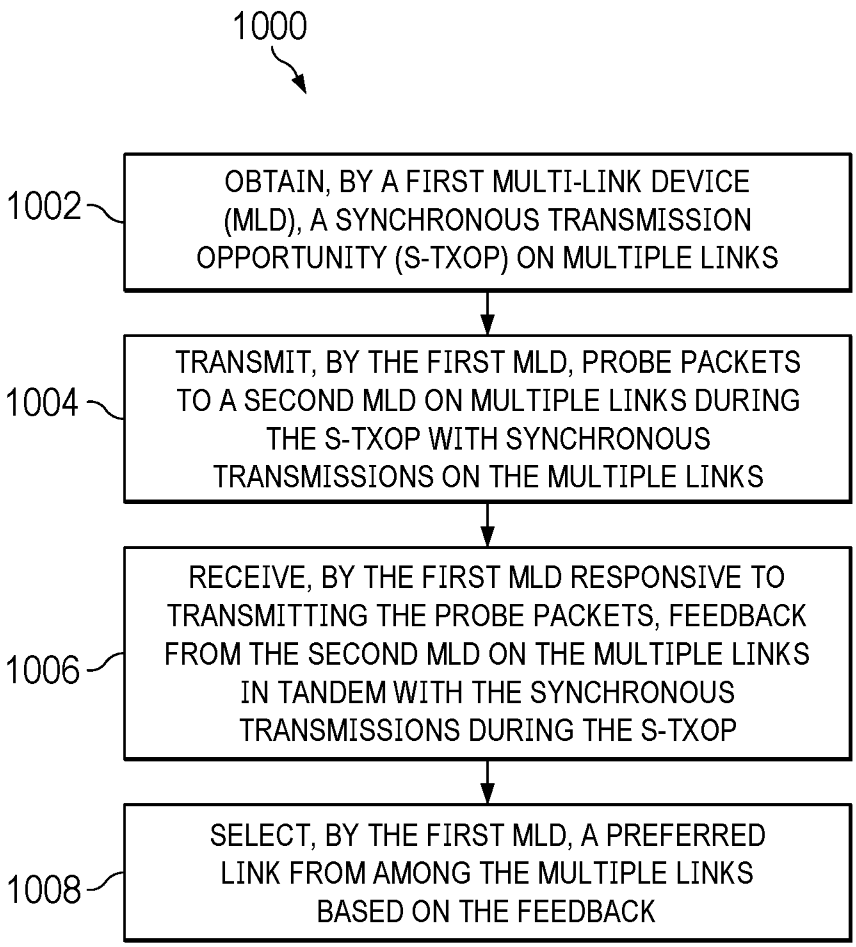
FIG. 10 is a flow diagram of a method for link selection, in accordance with various examples.

FIG. 10 is a flow diagram of a method 1000 for simultaneous channel quality assessment and selection during ML operation, in accordance with various examples. Method 1000 is performed by a first MLD configured to evaluate channel conditions at multiple links with synchronous transmissions of probe packets to a second MLD. Method 1000 describes memory (e.g., memory 102) storing non-transitory instructions. The memory is coupled to a processor (e.g., processor 101) that is coupled to a transceiver (e.g., transceiver 103) of a first MLD (e.g., communication system 100 may be an MLD such as MLD 210). The non-transitory instructions or logic (e.g., instructions 106) stored on the memory are executable by the processor to cause the processor to perform the steps of method 1000.

At step 1002, the instructions cause the processor to obtain, by a first MLD, a S-TXOP on multiple links. For example, MLD 210 obtains various S-TXOPs, such as any S-TXOP described above with respect to FIGS. 3-7. At step 1004, the instructions cause the processor to transmit, by the first MLD during the S-TXOP, probe packets to a second MLD with synchronous transmission on multiple links. Each link may be established between the first MLD and the second MLD over different channels of a wireless transmission medium. In at least one example, the instructions cause the processor to transmit, by the first MLD during the S-TXOP, the probe packets to the second MLD with synchronous probing transmissions on the multiple links. For example, MLD 210 transmits probe packets to MLD 220 with synchronous probing transmissions on first link 232 and on second link 234 during various S-TXOPs, such as any probe packet described above with respect to ML channel assessment phase 302 of FIG. 3, and first channel assessment sub-phase 404 of FIG. 4. In at least one example, the instructions cause the processor to transmit, by the first MLD during the S-TXOP, the probe packets to the second MLD with synchronous burst transmissions on the multiple links. For example, MLD 210 transmits probe packets to MLD 220 with synchronous burst transmissions on first link 232 and on second link 234 during various S-TXOPs, such as any probe packet described above with respect to ML channel assessment phase 502 of FIG. 5, first channel assessment sub-phase 604 of FIG. 6, and first channel assessment sub-phase 706 of FIG. 7.

At step 1006, the instructions cause the processor to receive, by the first MLD responsive to transmitting the probe packets, feedback from the second MLD on the multiple links in tandem with the synchronous transmissions during the S-TXOP. For example, MLD 210 receives, responsive to transmitting the probe packets with synchronous transmissions, feedback from MLD 220 on first link 232 and on second link 234 in tandem with the synchronous transmissions during various S-TXOPs, such as any feedback described above with respect to ML channel assessment phases 302, 402, 502, 602, and 704 of FIG. 3, FIG. 4, FIG. 5, FIG. 6, and FIG. 7, respectively. At step 1008, the instructions cause the processor to select, by the first MLD, a preferred link from among the multiple links based on the feedback. For example, MLD 210 selects second link 234 as a preferred link from among first link 232 and second link 234 based on various feedback received from MLD 220 in FIG. 3 during ML channel assessment phase 302, in FIG. 4 during first channel assessment sub-phase 404, in FIG. 5 during ML channel assessment phase 502, in FIG. 6 during first channel assessment sub-phase 604, and in FIG. 7 during first channel assessment sub-phase 706.

In at least some examples, the instructions further cause the processor to select, by the first MLD, a transmission parameter set for transmissions on the preferred link based on the feedback. In at least some examples, the instructions further cause the processor to transmit, by the first MLD device after the S-TXOP, another probe packet to the second MLD device during another S-TXOP with an asynchronous transmission on the preferred link. In at least some examples, the instructions further cause the processor to transmit, by the first MLD device during the S-TXOP, another probe packet to the second MLD device with an asynchronous transmission on the preferred link. In at least some examples, the instructions further cause the processor to select, by the first MLD during the S-TXOP, a transmission parameter set for transmissions on the preferred link based on the feedback; and transmit, by the first MLD device during the S-TXOP, data to the second MLD device with an asynchronous transmission on the preferred link.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a parameter means being within +/−10 percent of that parameter. Modifications are possible in the described examples, and other examples are possible within the scope of the claims.

What is claimed is:

1. A method, comprising:

transmitting, by a first device, probe packets to a second device on multiple links over N transmission opportunities (TXOPs) with synchronous probing transmissions on the multiple links during each TXOP, wherein Nis an integer greater than 1, the probe packets correspond to different transmission parameters, and the links are over different channels of a wireless transmission medium;

receiving, by the first device responsive to transmitting the probe packets, feedback from the second device on the multiple links in tandem with the synchronous probing transmissions over the N TXOPS;

selecting, by the first device, a selected link from the multiple links based on the feedback; and transmitting, by the first device, data over the selected link.

2. The method of claim 1, further comprising:

transmitting, by the first device, another probe packet over the selected link.

3. The method of claim 1, further comprising:

selecting, by the first device, a transmission parameter set for transmissions on the selected link based on the feedback, prior to transmitting the data over the selected link.

4. The method of claim 1, wherein feedback includes explicit feedback that the second device transmits to the first device on a link of the multiple links between successive transmissions by the first device on the link.

5. The method of claim 1, wherein transmitting the probe packets comprises transmitting, by the first device, duplicates of the probe packets to the second device.

6. The method of claim 1, wherein transmitting the probe packets comprises:

synchronizing, by a common link layer controller of the first device, transmission start times of the multiple links.

7. The method of claim 1, further comprising:

identifying, by the first device, a substandard link of the multiple links based on the feedback.

8. A method, comprising:

transmitting, by a device, probe packets as synchronous transmissions on multiple links during a transmission opportunity (TXOP), wherein: the probe packets correspond to different transmission parameters;

receiving, by the device responsive to transmitting the probe packets, feedback on the multiple links in tandem with the synchronous transmissions during the TXOP; and transmitting, by the device, over a selected link of the multiple links based on the feedback, another probe packet with an asynchronous transmission on the selected link.

9. The method of claim 8, wherein the feedback includes implicit feedback on a link of the multiple links.

10. The method of claim 8, further comprising:

selecting, by the device during the TXOP, a transmission parameter set for transmissions on the selected link based on the feedback.

11. The method of claim 10, wherein the TXOP is a first TXOP, and the method further comprising:

transmitting, by the device, data with an asynchronous transmission on the selected link during a second TXOP after the first TXOP.

12. The method of claim 8, further comprising:

transmitting, by the device, data with an asynchronous transmission on the selected link during the TXOP.

13. The method of claim 8, wherein each probe packet includes a source media access control (MAC) address that uniquely identifies a single link layer controller of the device.

14. The method of claim 8, wherein each probe packet includes a unique sequence number that is generated from a common sequence number space.

15. A system, comprising:

a transceiver of a multi-link device (MLD);

a processor coupled to the transceiver; and memory coupled to the processor, the memory storing non-transitory instructions that are executable by the processor to cause the processor to:

transmit, by the MLD via the transceiver during a transmission opportunity (TXOP), probe packets with synchronous transmissions on multiple links;

receive, by the MLD via the transceiver responsive to transmitting the probe packets, feedback on the multiple links during the TXOP;

communicate, by the MLD via the transceiver, over a selected link of the multiple links based on the feedback;

select, by the MLD during the TXOP, a transmission parameter set for transmissions on the selected link based on the feedback; and transmit, by the MLD during the TXOP, data with an asynchronous transmission on the selected link.

16. The system of claim 15, wherein instructions are executable by the processor to further cause the processor to:

transmit, by the MLD, the probe packets with synchronous burst transmissions on the multiple links during the TXOP.

17. The system of claim 15, wherein the TXOP is a first TXOP and the instructions are executable by the processor to further cause the processor to:

select, by the MLD, a transmission parameter set for transmissions on the selected link based on the feedback; and transmit, by the MLD after the first TXOP, another probe packet during a second TXOP with an asynchronous transmission on the selected link.

* * * * *